US012650362B2

(12) United States Patent
Hiller et al.

(10) Patent No.: US 12,650,362 B2
(45) Date of Patent: Jun. 9, 2026

(54) WIND TUNNEL TURBULENT AIRFLOW LASER SENSOR SYSTEM

(71) Applicant: The Boeing Company, Arlington, VA (US)

(72) Inventors: Nathan D. Hiller, Irvine, CA (US); Robert Michael Dowgwillo, St. Louis, MO (US); John A. Ladd, Maryland Heights, MO (US)

(73) Assignee: The Boeing Company, Arlington, VA (US)

( * ) Notice: Subject to any disclaimer, the term of this patent is extended or adjusted under 35 U.S.C. 154(b) by 314 days.

(21) Appl. No.: 18/507,359

(22) Filed: Nov. 13, 2023

(65) Prior Publication Data

US 2025/0155317 A1      May 15, 2025

(51) Int. Cl.
| | |
|---|---|
| *G01M 9/06* | (2006.01) |
| *G01M 9/04* | (2006.01) |
| *G01N 21/45* | (2006.01) |
| *G01P 5/26* | (2006.01) |

(52) U.S. Cl.
CPC .............. *G01M 9/065* (2013.01); *G01M 9/04* (2013.01); *G01N 21/45* (2013.01); *G01P 5/26* (2013.01); *G01N 2021/458* (2013.01)

(58) Field of Classification Search
CPC ................................ G01M 9/04; G01M 9/065
See application file for complete search history.

(56) References Cited

U.S. PATENT DOCUMENTS

| | | | |
|---|---|---|---|
| 5,121,985 | A | 6/1992 | Albrecht et al. |
| 7,106,447 | B2 | 9/2006 | Hays |

| | | | |
|---|---|---|---|
| 7,505,145 | B2 | 3/2009 | Hays et al. |
| 8,427,649 | B2 | 4/2013 | Hays et al. |
| 8,810,796 | B2 | 8/2014 | Hays et al. |

(Continued)

FOREIGN PATENT DOCUMENTS

| | | |
|---|---|---|
| CN | 1844873 B | 9/2010 |
| CN | 108519211 B | 11/2019 |

(Continued)

OTHER PUBLICATIONS

Barnhart, et al., "Design and Development of a Coherent Detection Rayleigh Doppler Lidar System for Use as an Alternative Velocimetry Technique in Wind Tunnels," Aug. 2020, 106 pages, ResearchGate, accessed Nov. 10, 2023, https://www.researchgate.net/publication/343770420_Design_and_Development_of_a_Coherent_Detection_Rayleigh_Doppler_Lidar_System_for_Use_as_an_Alternative_Velocimetry_Technique_in_Wind_Tunnels.

(Continued)

*Primary Examiner* — Eric S. McCall
(74) *Attorney, Agent, or Firm* — Yee & Associates, P.C.

(57) ABSTRACT

A laser wind tunnel turbulent airflow detection system comprising a laser sensor system and a controller. The laser sensor system is configured to emit laser beams in a wind tunnel from transmitter locations. The laser sensor system is configured to detect the laser beams at receiver locations. The controller is configured to emit the laser beams from the transmitter locations to the receiver locations using the laser sensor system. The controller is configured to determine beat frequencies of the laser beams detected by the laser sensor system at the receiver locations. The controller is configured to determine air turbulence in the wind tunnel for the receiver locations using the beat frequencies.

47 Claims, 23 Drawing Sheets

(56) References Cited

U.S. PATENT DOCUMENTS

| | | | | |
|---|---|---|---|---|
| 8,866,322 | B2 | | 10/2014 | Tchoryk et al. |
| 9,086,488 | B2 | | 7/2015 | Tchoryk et al. |
| D1,006,557 | S | * | 12/2023 | Gildersleeve ................. D6/541 |
| 12,441,468 | B2 | * | 10/2025 | Fan ........................ B64C 33/02 |
| 2021/0293659 | A1 | | 9/2021 | Ray et al. |
| 2023/0044330 | A1 | * | 2/2023 | Gildersleeve ........ B67D 1/0809 |

FOREIGN PATENT DOCUMENTS

| | | | |
|---|---|---|---|
| CN | 112113738 | A | 12/2020 |
| CN | 112098039 | B | 6/2021 |
| JP | 2020038135 | A | 3/2020 |
| WO | 2017216581 | A1 | 12/2017 |

OTHER PUBLICATIONS

Fried, "Optical Heterodyne Detection of an Atmospherically Distorted Signal Wave Front," Proceedings of the IEEE, Jan. 1967, pp. 57-67, vol. 55, No. 1, IEEE Xplore, accessed Nov. 10, 2023, https://ieeexplore.ieee.org/document/1447307.

Hulsman, et al., "Turbine Wake Deflection Measurement in a Wind Tunnel with a Lidar WindScanner," Journal of Physics: Conerence Series, 2020, 13 pages, vol. 1452, IPO Publishing, accessed Nov. 10, 2023, https://iopscience.iop.org/article/10.1088/1742-6596/1452/1/012007/meta.

Mylapore, et al., "Development and Wind Tunnel Testing of a Novel 3D Scanning Lidar for Global Velocimetry," AIAA Aviation 2019 Forum, Jun. 15, 2019, 13 pages, American Institute of Aeronautics and Astronautics, Reston, VA, USA, accessed Nov. 10, 2023, https://arc.aiaa.org/doi/pdf/10.2514/6.2019-2906.

VanDooren, et al., "Demonstration and uncertainty analysis of synchronised scanning lidar measurements of 2-D velocity fields in a boundary-layer wind tunnel," Wind Energy Science, 2017, pp. 329-341, vol. 2, Copernicus Publications, accessed Nov. 10, 2023, https://wes.copernicus.org/articles/2/329/2017/.

VanDooren, et al., "Demonstration of synchronised scanning Lidar measurements of 2D velocity fields in a boundarylayer wind tunnel," Journal of Physics: Conference Series, 2016, 11 pages, vol. 753, IOP Publishing, accessed Nov. 10, 2023, https://iopscience.iop.org/article/10.1088/1742-6596/753/7/072032/meta.

VanDooren, et al., "Modelling the spectral shape of continuous-wave lidar measurements in a turbulent wind tunnel," Atmospheric Measurement Techniques, Mar. 15, 2022, pp. 1355-1372, vol. 15, Copernicus Publications, accessed Nov. 10, 2023, https://amt.copernicus.org/articles/15/1355/2022/amt-15-1355-2022.html.

* cited by examiner

FIG. 1

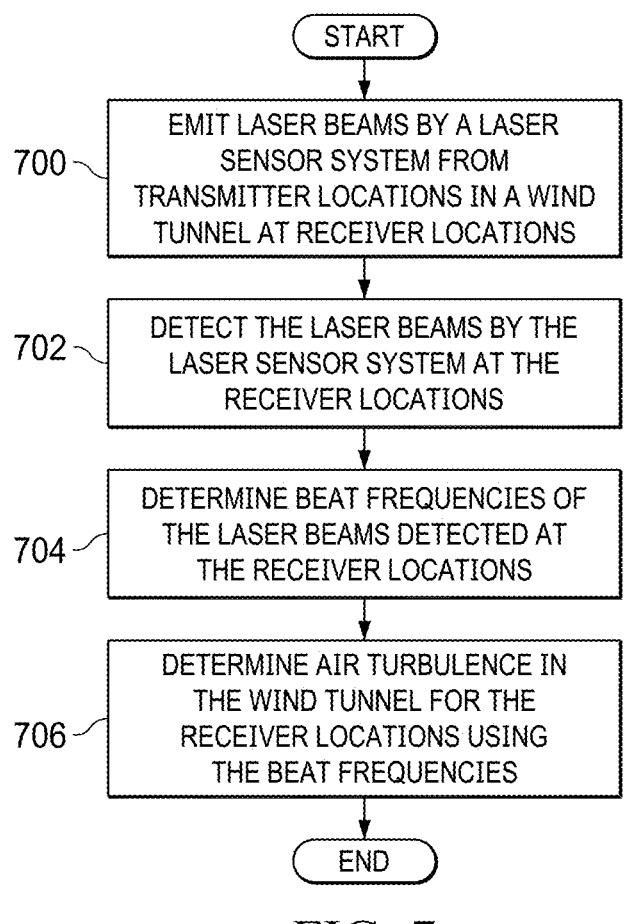

START

700 — EMIT LASER BEAMS BY A LASER SENSOR SYSTEM FROM TRANSMITTER LOCATIONS IN A WIND TUNNEL AT RECEIVER LOCATIONS

702 — DETECT THE LASER BEAMS BY THE LASER SENSOR SYSTEM AT THE RECEIVER LOCATIONS

704 — DETERMINE BEAT FREQUENCIES OF THE LASER BEAMS DETECTED AT THE RECEIVER LOCATIONS

706 — DETERMINE AIR TURBULENCE IN THE WIND TUNNEL FOR THE RECEIVER LOCATIONS USING THE BEAT FREQUENCIES

END

FIG. 7

START

800 — POSITION THE LASER TRANSMITTER SYSTEM AT THE TRANSMITTER LOCATIONS TO EMIT THE LASER BEAMS AT THE RECEIVER LOCATIONS

802 — POSITION THE OPTICAL RECEIVER SYSTEM AT THE RECEIVER LOCATIONS CORRESPONDING TO THE TRANSMITTER LOCATIONS TO RECEIVE THE LASER BEAMS EMITTED FROM THE TRANSMITTER LOCATIONS

END

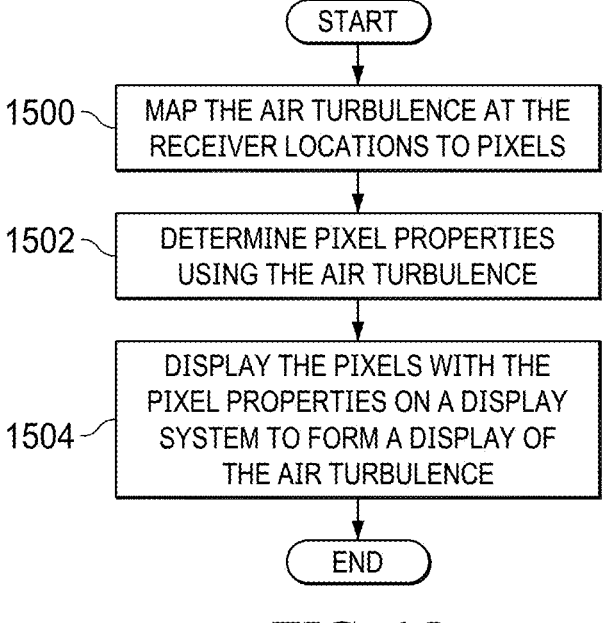

1500 ~ MAP THE AIR TURBULENCE AT THE RECEIVER LOCATIONS TO PIXELS

1502 ~ DETERMINE PIXEL PROPERTIES USING THE AIR TURBULENCE

1504 ~ DISPLAY THE PIXELS WITH THE PIXEL PROPERTIES ON A DISPLAY SYSTEM TO FORM A DISPLAY OF THE AIR TURBULENCE

FIG. 15

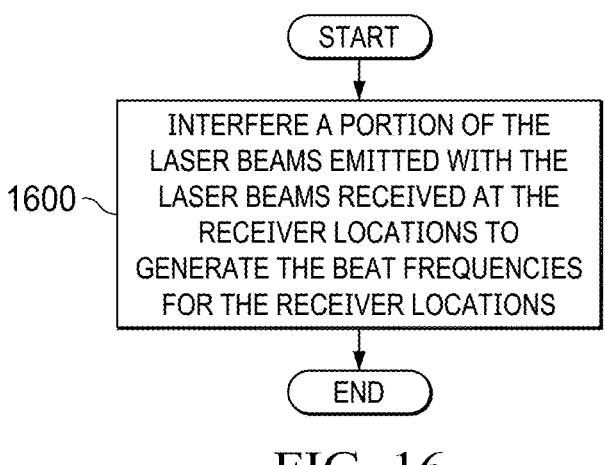

1600 ~ INTERFERE A PORTION OF THE LASER BEAMS EMITTED WITH THE LASER BEAMS RECEIVED AT THE RECEIVER LOCATIONS TO GENERATE THE BEAT FREQUENCIES FOR THE RECEIVER LOCATIONS

FIG. 16

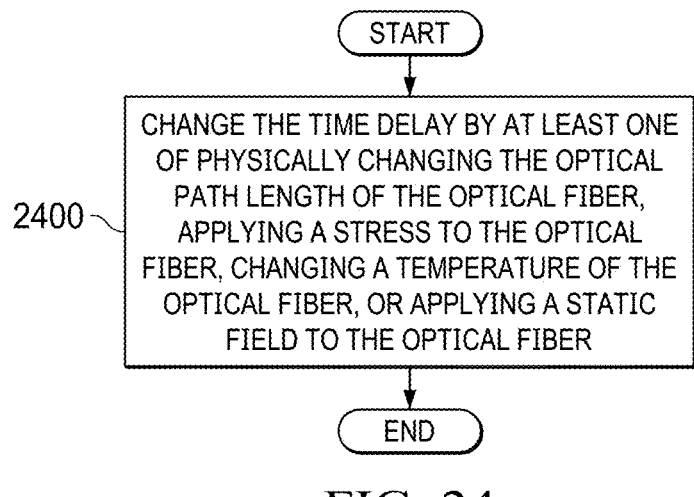

2400

START

CHANGE THE TIME DELAY BY AT LEAST ONE OF PHYSICALLY CHANGING THE OPTICAL PATH LENGTH OF THE OPTICAL FIBER, APPLYING A STRESS TO THE OPTICAL FIBER, CHANGING A TEMPERATURE OF THE OPTICAL FIBER, OR APPLYING A STATIC FIELD TO THE OPTICAL FIBER

END

FIG. 24

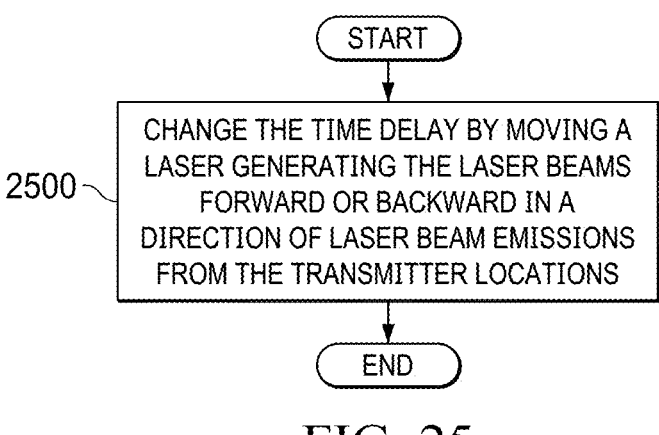

2500

START

CHANGE THE TIME DELAY BY MOVING A LASER GENERATING THE LASER BEAMS FORWARD OR BACKWARD IN A DIRECTION OF LASER BEAM EMISSIONS FROM THE TRANSMITTER LOCATIONS

END

2802 — SPECIFICATION AND DESIGN

2804 — MATERIAL PROCUREMENT

2806 — COMPONENT AND SUBASSEMBLY MANUFACTURING

2808 — SYSTEM INTEGRATION

2810 — CERTIFICATION AND DELIVERY

2812 — IN SERVICE

2814 — MAINTENANCE AND SERVICE

2900

AIRCRAFT

2902 — AIRFRAME        INTERIOR — 2906

SYSTEMS

PROPULSION SYSTEM        ELECTRICAL SYSTEM 2908        2912        2910        2914

HYDRAULIC SYSTEM        ENVIRONMENTAL SYSTEM        2904

WIND TUNNEL TURBULENT AIRFLOW LASER SENSOR SYSTEM

BACKGROUND INFORMATION

1. Field

The present disclosure relates generally to an air vehicle and, in particular, to detecting non-uniform airflow for an air vehicle test article in a wind tunnel.

2. Background

A wind tunnel is an aerodynamic testing system where an article for testing is held stationary within a duct and exposed to a specified stream of air. A wind tunnel can have different sizes and mechanisms of controlling the airflow. For example, the test chamber in a wind tunnel can have a width of about one foot to over 100 feet. The air moving through the wind tunnel can be as fast as supersonic or hypersonic velocities.

Aerodynamic properties of the object can be determined using the wind tunnel. The object can be a model of an air vehicle, the air vehicle, a model of a part for the air vehicle, or the part for the air vehicle. Models can be a full-scale or a reduced-scale model. A model that is a part of an air vehicle can be a wing, a fin, a stabilizer, an engine housing, or other object for the air vehicle.

A sensor system in the wind tunnel can make various measurements during the testing of an air vehicle in the test chamber. For example, aerodynamic forces can be measured on part or all of the air vehicle. The air vehicle can be a model for the actual air vehicle itself. Airflow around the air vehicle can be measured and visualized by introducing aerosols into the airflow in the wind tunnel. These aerosols can include smoke or other microscopic tracer particles. Measurements can also be enabled by the variations in the air density associated with non-uniform flow over the test article.

SUMMARY

An embodiment of the present disclosure provides a laser wind tunnel turbulent airflow detection system comprising a laser sensor system and a controller. The laser sensor system is configured to emit laser beams in a wind tunnel from transmitter locations. The laser sensor system is configured to detect the laser beams at receiver locations. The controller is configured to emit the laser beams from the transmitter locations to the receiver locations using the laser sensor system. The controller is configured to determine beat frequencies of the laser beams detected by the laser sensor system at the receiver locations. The controller is configured to determine air turbulence in the wind tunnel for the receiver locations using the beat frequencies.

Another embodiment of the present disclosure provides a method for measuring turbulence in a wind tunnel. Laser beams are emitted by a laser sensor system from transmitter locations in a wind tunnel at receiver locations. The laser beams are detected by the laser sensor system at the receiver locations. Beat frequencies of the laser beams detected at the receiver locations are determined. Air turbulence in the wind tunnel is determined for the receiver locations using the beat frequencies.

Still another embodiment of the present disclosure provides a laser wind tunnel turbulent airflow detection system comprising a laser sensor system and a controller. The laser sensor system is configured to generate laser beams. The laser sensor system is configured to generate reference laser beams from the laser beams. The laser sensor system is configured to emit the laser beams in a wind tunnel from transmitter locations. The laser sensor system is configured to receive the laser beams at receiver locations. The laser sensor system is configured to interfere the reference laser beams with the laser beams received at the receiver locations to generate interferometric responses. The controller is configured to emit the laser beams in the wind tunnel from the transmitter locations to the receiver locations using the laser sensor system. The controller is configured to determine air turbulence in the wind tunnel for the receiver locations using the interferometric responses.

Yet another embodiment of the present disclosure provides a laser wind tunnel turbulent airflow detection system comprising a laser sensor system and a controller. The laser sensor system is configured to generate laser beams; generate reference laser beams from the laser beams; and introduce a time delay in the laser beams to form time shifted laser beams. The laser sensor system is configured to emit the time shifted laser beams in a wind tunnel from transmitter locations. The laser sensor system is configured to receive the time shifted laser beams at receiver locations. The laser sensor system is configured to interfere the reference laser beams with the time shifted laser beams received at the receiver locations to generate interferometric responses. The controller is configured to emit the time shifted laser beams in the wind tunnel from the transmitter locations to the receiver locations using the laser sensor system. The controller is configured to determine air turbulence in the wind tunnel for the receiver locations using the interferometric responses.

Still another embodiment of the present disclosure provides a method for measuring air turbulence in a wind tunnel. Laser beams are generated. Reference laser beams are generated from the laser beams. A time delay is introduced in the laser beams to form time shifted laser beams. The time shifted laser beams are emitted in a wind tunnel from transmitter locations. The time shifted laser beams are received at receiver locations. The reference laser beams interfere the time shifted laser beams received at the receiver locations to generate interferometric responses. Air turbulence in the wind tunnel is determined for the receiver locations using the interferometric responses.

The features and functions can be achieved independently in various embodiments of the present disclosure or may be combined in other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 1 is an illustration of a schematic diagram of a wind tunnel having a laser wind tunnel turbulent airflow detection system in accordance with an illustrative embodiment;

FIG. 7 is an illustration of a flowchart of a process for measuring turbulence in a wind tunnel in accordance with an illustrative embodiment;

FIG. 8 is an illustration of a flowchart of a process for positioning components in a sensor system to emit and receive laser beams in accordance with an illustrative embodiment;

FIG. 15 is an illustration of a flowchart of a process for displaying air turbulence in accordance with an illustrative embodiment;

FIG. 16 is an illustration of a flowchart of process for interfering the laser beams in accordance with an illustrative embodiment;

FIG. 24 is an illustration of a flowchart of a process for changing a time delay in accordance with an illustrative embodiment;

FIG. 25 is an illustration of a flowchart of a process for changing a time delay in accordance with an illustrative embodiment;

DETAILED DESCRIPTION

Figure 2:
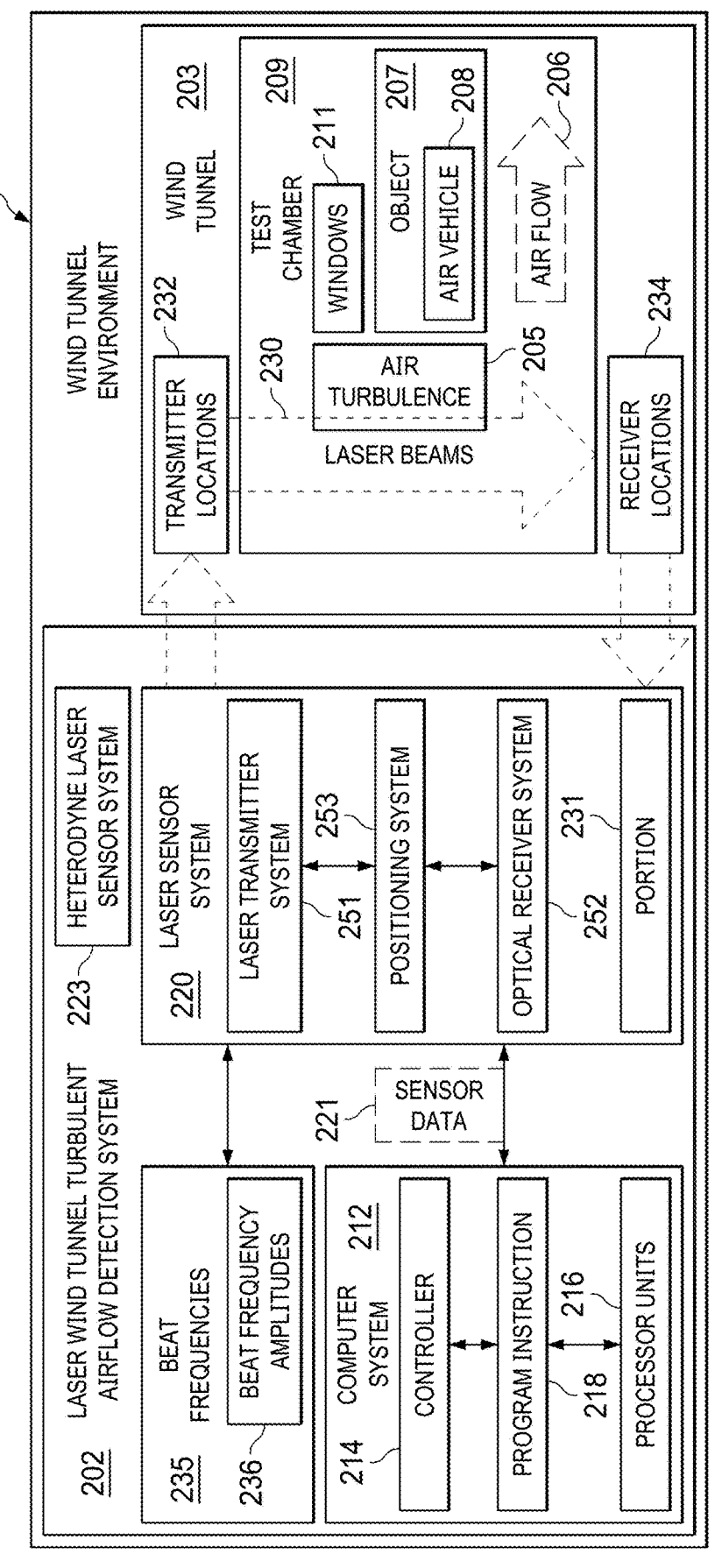
FIG. 2 is an illustration of a block diagram of a wind tunnel environment in accordance with an illustrative embodiment.

The illustrative embodiments recognize and take into account one or more different considerations as described herein. For example, although aerosols can provide a visualization of airflow, aerosols can affect the airflow. Further, the aerosols also produce a quantitative output. Aerosols can introduce inaccuracies or alter the results of tests on aerodynamics performed in a wind tunnel. For example, aerosols can change the fluid dynamics within the wind tunnel. These fluid dynamics can include, for example, flow field, turbulence levels, or other aerodynamic properties. Also, aerosols can interact with the surface of objects being tested in the wind tunnel. For example, if aerosols adhere to the surface of the object, then boundary layer characteristics or other interactions can change. As another example, aerosols can also cause changes in temperature and humidity conditions that can affect the density and viscosity of air flowing in the wind tunnel.

A technique that does not use aerosols is the Schlieren technique. This technique can be used to visualize airflow at supersonic speeds. When airflow travels at a speed that is faster than sound, a bow shock occurs in which the turbulent airflow is not present in front of the bow shock. Turbulent airflow is not present within bow shock.

The Schlieren technique is an optical method used to visualize and analyze variations in air density of the airflow. A collimated light beam is directed through the air and an optical system is used to detect the refractive index of the air caused by density gradients. These changes in the refractive index are converted into visible patterns to enable visualization of an outline of the bow shock and boundary layers. This technique does not provide a visualization of the turbulent airflow in the boundary layers.

Thus, illustrative embodiments provide a method, apparatus, system, and computer program product for detecting turbulent airflow in a wind tunnel. In one illustrative example, a laser wind tunnel turbulent airflow detection system comprising a laser sensor system and a controller. The laser sensor system is configured to emit laser beams in a wind tunnel from transmitter locations. The laser sensor system is configured to detect the laser beams at receiver locations. The controller is configured to emit the laser beams from the transmitter locations to the receiver locations using the laser sensor system. The controller is configured to determine beat frequencies of the laser beams detected by the laser sensor system at the receiver locations. The controller is configured to determine air turbulence in the wind tunnel for the receiver locations using the beat frequencies.

Figure 1:
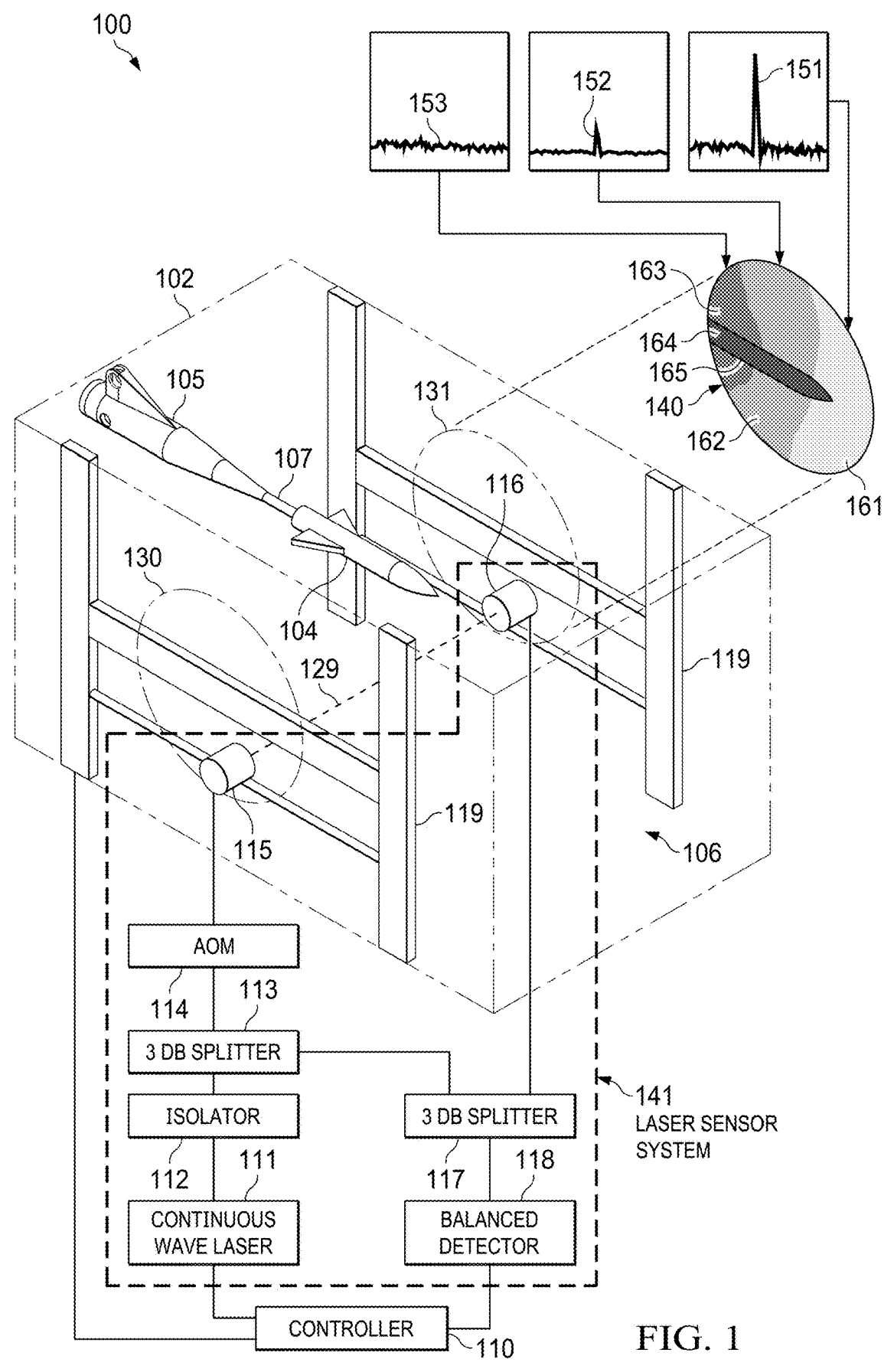

With reference now to the figures and, in particular, with reference to FIG. 1, an illustration of a schematic diagram of a wind tunnel having laser wind tunnel turbulent airflow detection system is depicted in accordance with an illustrative embodiment. As depicted, wind tunnel 100 has test chamber 102 in which a number of aerodynamic properties of air vehicle 104 can be tested. As depicted, air vehicle 104 is held within test chamber 102 of wind tunnel 100 by sting mount 105. In this example, sting mount 105 uses rod 107 attached to the center of gravity of air vehicle 104. This type of mounting system can reduce interference with airflow around air vehicle 104.

In this illustrative example, the number of aerodynamic properties can take a number of different forms. For example, the number of aerodynamic properties can be selected from at least one of lift, drag, turbulent airflow, or other suitable properties.

As used herein, "a number of" when used with reference to items, means one or more items. For example, "a number of aerodynamic properties" is one or more aerodynamic properties.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

In this illustrative example, wind tunnel 100 also includes laser wind tunnel turbulent airflow detection system 106. This system detects turbulent airflow occurring during testing of air vehicle 104 within test chamber 102 in wind tunnel 100.

Laser wind tunnel turbulent airflow detection system 106 is comprised of a number of different components. As depicted, the system includes controller 110, continuous wave laser 111, isolator 112, 3 dB splitter 113, acousto-optic modulator (AOM) 114, laser transmitter 115, optical receiver 116, 3 dB splitter 117, balanced detector 118, and positioning system 119.

In this example, continuous wave laser 111, isolator 112, 3 dB splitter 113, acousto-optic modulator (AOM) 114, laser transmitter 115, optical receiver 116, 3 dB splitter 117, and balanced detector 118 form laser sensor system 141.

As depicted, these components are located outside test chamber 102. Laser transmitter 115 can emit laser beam 129 through window 130 into test chamber 102 in which laser beam 129 is received by optical receiver 116 through window 131.

In this example, continuous wave laser 111, isolator 112, 3 dB splitter 113, acousto-optic modulator (AOM) 114, and laser transmitter 115 can be connected using optical fibers. Optical receiver 116, 3 dB splitter 117, and balanced detector 118 can also be connected to each other using optical fibers. Balanced detector 118 can be connected to controller 110 by a wire or optical connection. Controller 110 can be connected to continuous wave laser and positioning system 119 using a wire or optical fiber.

In this example, positioning system 119 is controlled by controller 110. In this example, positioning system 119 can position laser transmitter 115 and optical receiver 116 at different locations relative to window 130 and window 131 in a manner that allows laser transmitter 115 to transmit laser beam 129 that is received by optical receiver 116.

In other words, these two components can be moved in a manner to have the same xy coordinates in a Cartesian coordinate system. The xy coordinates for laser transmitter 115 can be said to correspond to the xy coordinates for optical receiver 116.

For example, laser transmitter 115 can have xy coordinates and optical receiver 116 can have the same xy coordinates. This type of positioning of laser transmitter 115 and optical receiver 116 enables transmitting and detecting laser beams at different locations described by xy coordinates.

In this example, continuous wave laser 111 is a hardware system and emits a laser beam continuously rather than in pulses. In this example, the laser beam passes through isolator 112. Isolator 112 is an optical isolator that operates to ensure that reflected or backscatter light does not travel back into continuous wave laser 111.

As depicted, 3 dB splitter 113 splits a portion of the laser beam and sends that portion back into 3 dB splitter 117. A 3 dB splitter is a hardware device that divides or splits an optical signal such as the laser beam emitted by continuous wave laser 111. The other portion of this laser beam is sent through an acousto-optic modulator 114 which operates to control the frequency of the laser beam. In this example, the frequency of the laser beam is shifted relative to the portion of the laser beam split and sent into 3 dB splitter 117.

That portion of the laser beam sent into 3 dB splitter 117 has the same frequency as continuous wave laser 111. On the other hand, the portion of the laser beam from acousto-optic modulator 114 to laser transmitter 115 is shifted from the frequency of the original laser beam emitted by continuous wave laser 111 and is emitted as laser beam 129. This laser beam is detected by optical receiver 116, which is connected to 3 dB splitter 117.

In this example, 3 dB splitter 117 interferes with laser beam 129 as detected by optical receiver 116 with the portion of the original laser beam emitted by continuous wave laser 111. Laser beam 129 received by optical receiver 116 has a different frequency from the portion of the laser beam split by 3 dB splitter 113 into 3 dB splitter 117.

This laser system is a heterodyne laser system in which interference of light from laser beams with two frequencies is performed to obtain a beat frequency. In this illustrative example, a beat frequency is a result of combining two laser beams at different frequencies. This combination creates a new frequency that is the difference between the original two frequencies. This frequency can be observed as a beating pattern in the intensity of the combined beams.

In this illustrative example, balanced detector 118 detects this intensity to generate measurement of power that is sent to controller 110. This measurement of power is referred to as a beat frequency amplitude. Further, balanced detector 118 can also operate to reduce noise. This reduction can improve the signal-to-noise ratio that is detected and analyzed by controller 110.

In this example, controller 110 can be a server computer, laptop computer, a tablet computer, a mobile phone, or other hardware system that can control the operation of the different components in laser wind tunnel turbulent airflow detection system 106. For example, controller 110 can control the emission of laser beams by continuous wave laser 111. Further, controller 110 can control positioning system 119 to move laser transmitter 115 and optical receiver 116 into different positions. Further, controller 110 can control the operation of laser sensor system 141 to determine beat frequencies using balanced detector 118 in laser sensor system 141.

In addition to controlling the operation of these components, controller 110 can also receive signals from balanced detector 118. In this example, the signals are a measurement of power in the form of a beat frequency detected by balanced detector 118. The beat frequencies have amplitudes that can be used to determine the air turbulence. In this example, the maximum amplitude of the beat frequency is used to determine the amount of air turbulence. Further, the amplitude of the beat frequency can be processed by balanced detector 118 with respect to noise to obtain a signal-to-noise ratio (SNR) for the amplitude of the beat frequency with respect to noise. Thus, balanced detector 118 outputs beat frequency amplitudes in the form of signal-to-noise ratios.

Further, controller 110 can analyze these signals generated by balanced detector 118. By analyzing the signal-to-noise ratios derived from the beat frequencies, controller 110 can be displayed as display 140 using the signal-to-noise ratios received from balanced detector 118. As depicted, display 140 has a shape corresponding to window 131 and which optical receiver 116 is positioned and moved to receive laser beam 129 emitted from laser transmitter 115. Depending on the locations used, display 140 can have a different shape such as a rectangle or square.

In this illustrative example, pixels in display 140 correspond the locations at which optical receiver 116 receives laser beam 129. The measurements of laser beam 129 interfered with the unshifted version of the laser beam are interfered and detected by balanced detector 118 to generate electrical signals that represent signal-to-noise ratios for use in generating pixels for display 140.

When the two laser beams are interfered with each other, they produce a signal that is in the form of measured power over time. The frequency content of this "measured power over time" is displayed as a single peak. The height of this peak divided by its noise floor is the signal to power ratio. The amplitude of this peak is power (watts or milliwatts, etc.). Controller 110 can determine frequencies by laser sensor system 141 using signals from balanced detector 118.

In this depicted example, laser beam 129 has an optical path length. This optical path length can change depending on whether turbulence is present within from the airflow over air vehicle 104 and test chamber 102. The variability of the optical path length can change across the cross section of laser beam 129.

When the "variability of optical path length" increases, the signal to noise ratio decreases. When the "variability of optical path length" decreases, the signal to noise ratio of the beat frequency amplitude to noise increases. A parameter that captures the opposite of "variability of optical path length across the beam's cross section" is ρo which is called the "atmospheric turbulence field coherence length." When ρo increases, the signal to noise ratio of the beat frequency amplitude to noise increases, and when ρo decreases, the signal to noise ratio decreases.

In this example, the properties of the pixels that change in the signal-to-noise ratio are used to determine properties for the pixels in display 140. For example, first pixel color 161 can be used for a high signal-to-noise ratio, second pixel color 162 can be used for moderate signal-to-noise ratio, and third pixel color 163 can be used for a low signal-to-noise ratio.

In one example, large beat frequency amplitude 151 indicates smooth airflow. This beat frequency can be compared to the noise to obtain a signal-to-noise ratio. When the signal-to-noise ratio is over a first threshold, the signal-to-noise ratio indicates a smooth airflow.

When moderate beat frequency amplitude 152 is present, a signal-to-noise ratio is obtained from comparing the amplitude to the noise. When the signal-to-noise ratio is greater than a second threshold but less than the first threshold, the signal-to-noise ratio is considered moderate indicating moderate turbulent airflow in this example.

Further, an absence of a beat frequency amplitude 153 indicates heavily turbulent airflow. In this case, the signal-to-noise ratio is zero. This value for the signal-to-noise ratio indicates the presence of heavy air turbulence as compared to moderate air turbulence or smooth airflow.

In this illustrative example, fourth pixel color 164 is used to indicate when laser beam 129 is not received by optical receiver 116. The situation can indicate the presence of air vehicle 104. With this pixel color, the presence of air vehicle 104 in display 140 can be identified by region 165 in display 140.

The illustration of wind tunnel 100 and laser wind tunnel turbulent airflow detection system 106 for wind tunnel 100 is presented in this illustrative example as one implementation and not meant to limit the manner in which other illustrative examples can be implemented. For example, other types of mounting systems can be used in place of sting mount 105. For example, a strut mounting system, a suspended mounting system, a wall mount, or other type mounting system can be used in place of sting mount 105. As another example, one or more laser transmitters and optical receivers can be used in addition to laser transmitter 115 and optical receiver 116 to emit laser beams and receive the laser beams.

In still another illustrative example, balanced detector 118 can be a component located in controller 110 or a separate component from laser sensor system 141 in communication with controller 110. Controller 110 can control balanced detector 118 to generate signal-to-noise ratios using the beat frequencies detected by balanced detector 118. In other examples, controller 110 can control balanced detector 118 to send it frequency amplitudes without generating signal-to-noise ratios. In an illustrative example, a detector can be used without needing functionality reducing noise in balanced detector 118.

In yet another illustrative example, free space can be used as a medium in place of optical fibers. With this example, a beam splitter can be used to split the laser beam and a beam combiner can be used to combine laser beams.

With reference now to FIG. 2, an illustration of a block diagram of a wind tunnel environment is depicted in accordance with an illustrative embodiment. In this illustrative example, wind tunnel environment 200 includes components that can be implemented in hardware such as the hardware shown in wind tunnel 100 in FIG. 1. In this illustrative example, laser wind tunnel turbulent airflow detection system 202 can be used with wind tunnel 203 to determine air turbulence 205 in wind tunnel 203. In these examples, air turbulence 205 covers all types of non-uniform airflow. This non-uniform airflow can be, for example, at least one of unsteady, attached, or separated.

In particular, laser wind tunnel turbulent airflow detection system 202 can be used to determine air turbulence 205 in test chamber 209 in wind tunnel 203. In this example, air turbulence 205 can result from airflow 206 over object 207 in test chamber 209 in wind tunnel 203. As depicted, object 207 takes the form of air vehicle 208. In this illustrative example, air vehicle 208 can be selected from a group comprising an aircraft, a commercial airplane, a cargo airplane, a tilt-rotor aircraft, a tilt wing aircraft, a vertical takeoff and landing aircraft, a rotorcraft, an unmanned aerial vehicle, a drone, an electric vertical takeoff and landing vehicle, a personal air vehicle, a glider, a spaceplane, a rocket, a reusable launch vehicle, and other types of vehicles that can fly in the atmosphere. In this example, when referring to air vehicle 208, air vehicle 208 can be the actual air vehicle or a model of air vehicle.

In this illustrative example, laser wind tunnel turbulent airflow detection system 202 is comprised of a number of different components. As depicted, laser wind tunnel turbulent airflow detection system 202 includes laser sensor system 220 and controller 214.

Laser sensor system 220 is a hardware system and can include software. Laser sensor system 141 in FIG. 1 is an example of one implementation for laser sensor system 220. In this example, laser sensor system 220 emits laser beams 230 in wind tunnel 203 from transmitter locations 232 and detect laser beams 230 at receiver locations 234. These receiver locations can also be referred to as measurement locations. In this depicted example, laser beams 230 are coherent laser beams.

Laser sensor system 220 can be in a location that is external to test chamber 209 in wind tunnel 203. For example, transmitter locations 232 and receiver locations 234 can be located outside of test chamber 209 in which laser beams 230 transmitted and received at these locations through windows 211 in test chamber 209. In other examples, laser sensor system 220 can have some components located within test chamber 209. In this example, windows 211 are portals in test chamber 209 that enable the transmission of laser beams 230 from outside of test chamber 209 and the reception of laser beams 230 from outside of test chamber 209. These portals can also be used for viewing by human operators.

In this illustrative example, laser sensor system 220 is a laser sensor system in which sensor data 221 is generated using laser beams 230 and portion 231 of laser beams 230. In this example, portion 231 of laser beams 230 and laser beams 230 are shifted with respect to each other. In other words, portion 231 of laser beams 230 can have a frequency that is different from laser beams 230.

In one example, laser sensor system 220 is heterodyne laser sensor system 223. With this example, laser beams 230 can be shifted in frequency. In another illustrative example, portion 231 of laser beams 230 can be shifted in frequency.

Laser sensor system 220 interferes laser beams 230 received at receiver locations 234 by laser sensor system 220 with portion 231 of laser beams 230 for different locations and receiver locations 234. In other words, laser sensor system 220 is configured to interfere portion 231 of laser beams 230 emitted with laser beams 230 received at receiver locations 234 to generate the beat frequencies 235.

The interference of a laser beam in portion 231 with a laser beam in laser beams 230 received at receiver locations 234 results in a signal representing the outer envelope. The outer envelope is a signal that has an amplitude profile that results from the interference of two light waves with different frequencies. This envelope can be measured as compared to the oscillations of the light signals within the envelope.

In these examples, the envelope is measured. The intensity is measured in terms of power to provide the frequency amplitude. As result, laser sensor system 220 can measure beat frequency amplitudes 236 for beat frequencies 235. Laser sensor system 220 uses these measurements to generate sensor data 221 that is sent to controller 214.

Sensor data 221 sent to controller 214 can take a number of different forms. For example, sensor data 221 can be beat frequency amplitudes 236 with timestamps. In another illustrative example, sensor data 221 can be in the form of signal-to-noise ratios (SNRs) generated from beat frequency amplitudes 236 and noise.

In this example, controller 214 is located in computer system 212 and can be implemented in software, hardware, firmware or a combination thereof. When software is used, the operations performed by controller 214 can be implemented in program instructions configured to run on hardware, such as a processor unit. When firmware is used, the operations performed by controller 214 can be implemented in program instructions and data and stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instruction 218 implementing processes in the illustrative examples. In other words, program instruction 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instruction 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, controller 214 emits laser beams 230 from transmitter locations 232 to receiver locations 234 using laser sensor system 220. Controller 214 determines beat frequencies 235 of the laser beams 230 detected by the laser sensor system at the receiver locations. Beat frequencies 235 can be determined from sensor data 221 received from laser sensor system 220. In this example, controller 214 determines air turbulence 205 in wind tunnel 203 for the receiver locations 234 using beat frequencies 235.

In one illustrative example, one or more solutions are present that overcome a problem with accurately measuring air turbulence. The solutions in the illustrative examples do not need to employ aerosols, which can affect the airflow during testing. Further, with one or more illustrative examples, visualization of air turbulence can be generated as compared to current techniques such as the Schlieren technique.

With ability to at least one of determine air turbulence or visualize air turbulence, designs for air vehicles can be generated and improved upon. With at least one of visualization or analysis, design changes can be made to air vehicles in a manner that mitigates undesirable flow behavior. Mitigating this undesirable flow behavior can result in, among other things, increases in fuel efficiency of those air vehicles.

Figure 3:
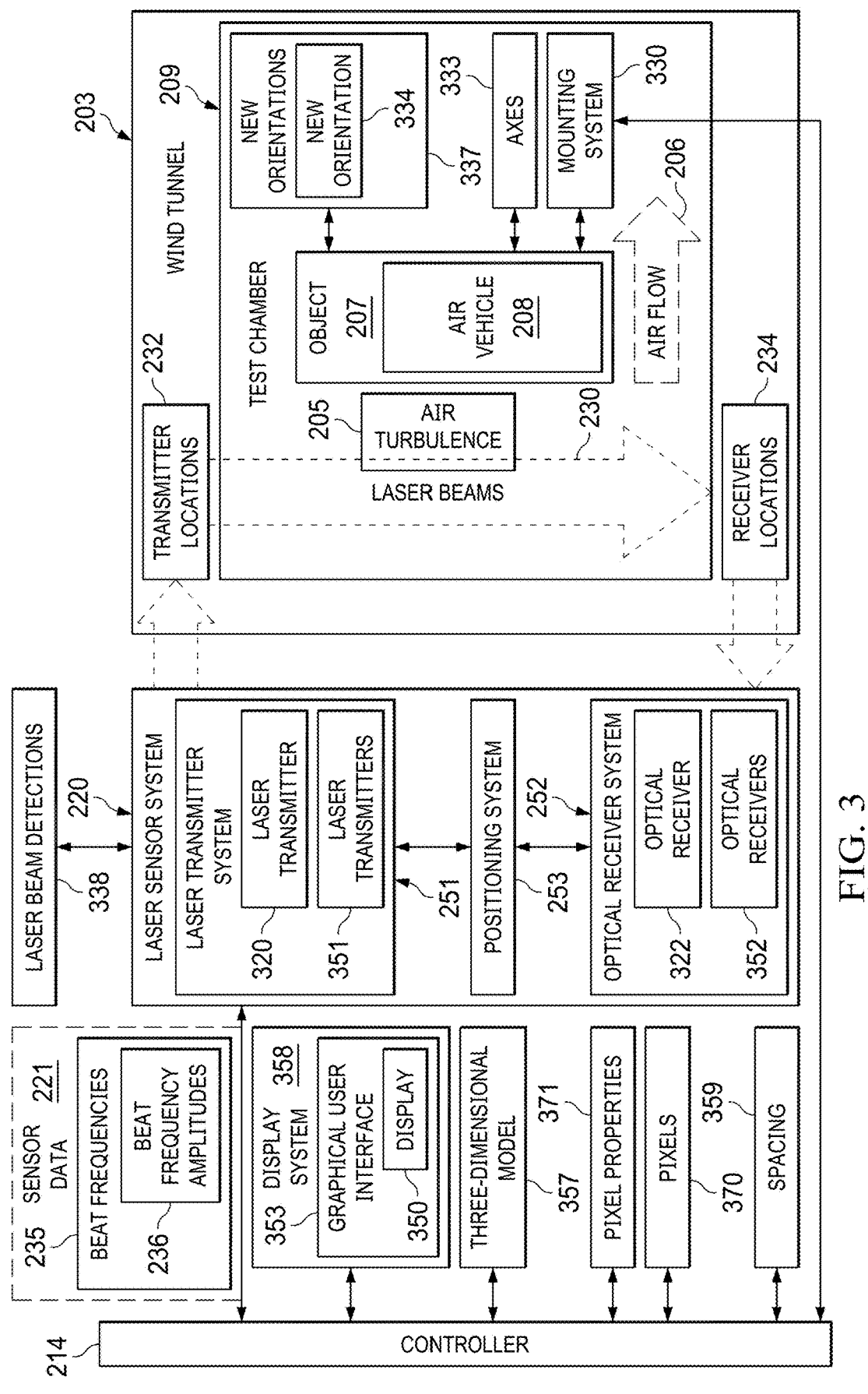
FIG. 3 is an illustration of a laser sensor system in accordance with an illustrative embodiment.

Turning next to FIG. 3, an illustration of a laser sensor system is depicted in accordance with an illustrative embodiment. In the illustrative examples, the same reference numeral may be used in more than one figure. This reuse of a reference numeral in different figures represents the same element in the different figures. Examples of components that can be used to implement laser sensor system 220 are depicted in this figure.

As depicted, laser sensor system 220 is comprised of laser transmitter system 251, optical receiver system 252, and positioning system 253. In this example, laser transmitter system 251 emits laser beams 230 from transmitter locations 232 in wind tunnel 203 at receiver locations 234. These laser beams are emitted to travel through test chamber 209 in wind tunnel 203. Optical receiver system detects laser beams 230 at receiver locations 234.

In this example, positioning system 253 moves laser transmitter 320 and optical receiver 322 to corresponding transmitter and receiver locations in transmitter locations 232 and receiver locations 234.

In one illustrative example, laser transmitter system 251 comprises laser transmitter 320. Optical receiver system 252 comprises optical receiver 322. With this example, positioning system 253 moves laser transmitter 320 and optical receiver 322 to corresponding transmitter and receiver locations in transmitter locations 232 and receiver locations 234.

For example, positioning system 253 can move laser transmitter 320 to scan transmitter locations 232 to emit laser beams 230 at receiver locations 234. Positioning system 253 can also move optical receiver 322 to receiver locations 234 corresponding to transmitter locations 232 to receive laser beams 230 emitted from transmitter locations 232.

In this example, transmitter locations 232 and receiver locations 234 are defined using a Cartesian coordinate system and wherein a transmitter location and a receiver location corresponding to the transmitter location has a same xy coordinate. With this example, laser transmitter 320 and optical receiver 322 can be moved to scan a line for an x-axis or a y-axis and then moved to another line. This movement of these components can be performed using steps or a continuous movement depending on the particular implementation.

Further in this illustrative example, controller 214 can calibrate laser transmitter 320 with optical receiver 322 at each of some of transmitter locations 232 and receiver locations 234. This calibration can be formed to ensure that the best or greater signal is received by optical receiver 322 at each of receiver locations 234.

This calibration can be performed prior to testing object 207, such as air vehicle 208 within test chamber 209 of wind tunnel 203. In other words, all of receiver locations 234 can be calibrated prior to beginning the test. In other illustrative examples, the calibration can be performed prior to emitting laser beams 230 at each of transmitter locations 232 and receiver locations 234. In this example, the calibration is performed during the testing of object 207 to determine air turbulence 205.

In an illustrative example, calibration while wind tunnel 203 is turned off may provide the most sensitive operating point. This operating point may shift when wind tunnel 203 is turned on. This shift can occur, for example, from an air density change. As result, calibration can be performed again or when wind tunnel 203 is turned on and operating to test object 207 for air turbulence 205.

In these illustrative examples, wind tunnel 203 can also include mounting system 330. Mounting system 330 is a hardware device that can hold object 207 in test chamber 209 in wind tunnel 203. Mounting system 330 can be implemented using various types of mounting systems. For example, mounting system 330 can be implemented using a three-strut mount, a sting mount, a cable system, a balance mount, a ceiling mount, and wall mount, a floor mount, or other type of structure that can be used to hold object 207 within test chamber 209 for testing in wind tunnel 203.

In this illustrative example, controller 214 can rotate object 207 about a number of axes 333 in wind tunnel 203 to new orientation 334 using mounting system 330 in response to laser sensor system 220 emitting laser beams 230 from transmitter locations 232 to receiver locations 234. In this example, the rotation occurs after all or some desired number of transmitter locations 232 and receiver locations 234 have used to transmit and receive laser beams 230. After object 207 has been rotated, controller 214 can emit laser beams 230 from transmitter locations 232 to receiver locations 234 with object 207 in new orientation 334. In this example, beat frequencies 235 can be determined for the transmission of laser beams 230 at each of receiver locations 234. These beat frequencies can be used to determine air turbulence 205 occurring during testing of object 207 within test chamber 209 of wind tunnel 203. For example, the data representing the signals for these beat frequencies can be analyzed to identify beat frequency amplitudes 236 for use in determining air turbulence 205 within test chamber 209 that is present at each of receiver locations 234.

In this illustrative example, controller 214 can repeat rotating object 207 and emitting laser beams 230 for a number of new orientations 337 of object 207 to create sets of laser beam detections 338.

In this example, controller 214 determines beat frequencies 235 for each of the number of new orientations 337 using the sets of laser beam detections 338 to form sets of beat frequencies 235 using laser sensor system 220. In this example, these laser beam detections are used to create sensor data 221. Sensor data 221 can be, for example, beat frequencies 235 and can include beat frequency amplitudes 236. This data can be used by controller 214 to determine air turbulence 205 for object 207 in wind tunnel 203. With this example, each set in sets of beat frequencies 235 is a set of beat frequencies 235 for a particular orientation for object 207. As used herein, "a set of" when used with reference items means one or more items. For example, a set of beat frequencies 235 is one or more beat frequencies 235. When multiple sets are present, each set can have one or more beat frequencies 235.

In this example, sensor data 221 can be used to generate display 350 on display system 358. This sensor data can be for a single set of beat frequencies at one orientation or multiple sets of the frequencies at multiple orientations. In this illustrative example, display 350 is data that can be displayed in display system 358.

Display system 358 is a physical hardware system and includes one or more display devices on which graphical user interface 353 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information. In this example, display 350 can be displayed within graphical user interface 353 on display system 358.

For example, with multiple sets of beat frequencies 235 from multiple orientations, controller 214 can generate three-dimensional model 357 of air turbulence using the sets of beat frequencies. Controller 214 displays three-dimensional model 357 of air turbulence 205 on display system 358.

Further, in positioning transmitter locations 232 and receiver locations 234, controller 214 can control spacing 359 for transmitter locations 232 and receiver locations 234. In this example, the spacing is spacing along an X or Y axis in a Cartesian coordinate system. For example, spacing 359 can be controlled for transmitter locations 232. Further, spacing 359 can also be controlled to receiver locations 234 in a manner that corresponds to spacing 359 from transmitter locations 232.

In one illustrative example, spacing 359 between locations in the transmitter locations 232 and receiver locations 234 corresponding to transmitter locations 232 is selected on an amount of air turbulence 205 detected. With this example, air turbulence 205 is represented by beat frequency amplitudes 236 determined for receiver locations 234. In these examples, a greater beat frequency amplitude indicates lower level of air turbulence 205 as compared to a lower beat frequency amplitude.

In this example, spacing 359 between the locations increases as beat frequency amplitudes 236 increase, and spacing 359 between the locations decreases as beat frequency amplitudes 236. Greater spacing can be used between receiver locations 234 when no turbulence is detected, and the spacing is reduced when turbulence is detected.

In another illustrative example, the laser transmitter system 251 comprises laser transmitters 351 at transmitter locations 232 and optical receiver system 252 comprises optical receivers 352 at the receiver locations 234. With this example, multiple laser transmitters and multiple optical receivers can be held in fixed positions such as transmitter locations 232 and receiver locations 234. With this example, positioning system 253 includes a frame system that holds laser transmitters 351 at transmitter locations 232 and holds optical receivers 352 at receiver locations 234. In yet another illustrative example, an array of laser transmitters 351 and an array of optical receivers 352 can be used with those receivers moved from line to line in an xy coordinate system.

Receiver locations 234 can be mapped to pixels 370. With this example, controller 214 can map air turbulence 205 at receiver locations 234 to pixels 370. Further, controller 214 can determine pixel properties 371 using air turbulence 205. For example, pixel properties 371 can include color, intensity, or other graphical indicators that can be used to identify the level or amount of air turbulence 205. In this example, controller 214 can display pixels 370 with pixel properties 371 on display system 358 to form display 350 of air turbulence 205.

In this illustrative example, laser wind tunnel turbulent airflow detection system 202 can be an automated system. In other words, the system can operate automatically without needing user input to determine air turbulence for an object. This automated operation can be performed using controller 214.

Further, in some illustrative examples, laser wind tunnel turbulent airflow detection system 202 can be operated remotely. In other words, controller 214 can receive an instruction to initiate automated operation or controlled operation in which specifics operations are performed based on input. This input can be received from a remote location from wind tunnel 203. For example, wind tunnel 203 can be located in one building while control signals can be received by controller 214 from the location. Further, in some illustrative examples controller 214 can be a distributed component.

For example, a portion of controller 214 can run on one or more of processor units 216 in the location where wind tunnel 203 is located. Another portion of controller 214 can run on one or more other of processor units 216 in a remote location. This remote location can be in another building, another city, or some other suitable remote location.

The illustration of wind tunnel environment 200 in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, positioning system 253 can be considered part of laser sensor system 220 in some illustrative examples. In another example, object 207 can take other forms in addition to or in place of air vehicle 208. Object 207 can be, for example, a building, a bridge, a train, a submarine, a propeller, or other suitable object. Object 207 can also include components for air vehicle 208. For example, object 207 can be a wing, a fairing, and engine housing, a propeller, a fuselage, or other suitable component.

Figure 4:
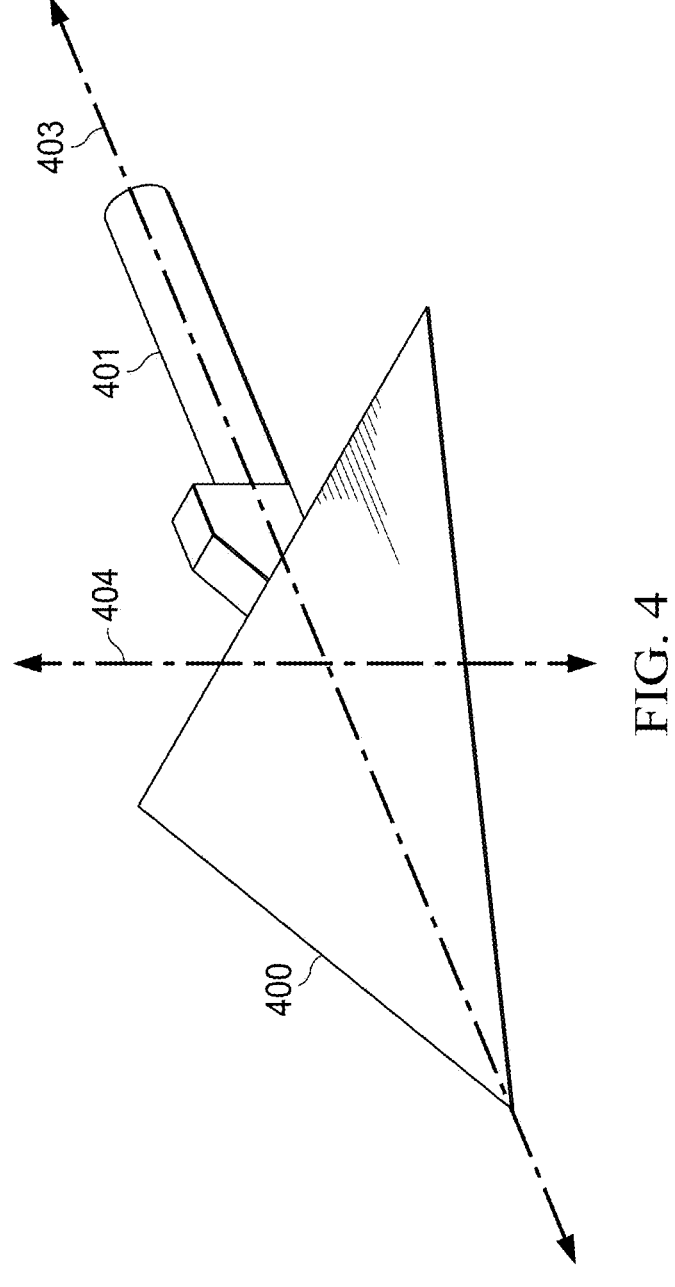
FIG. 4 is an illustration of a test article for testing in a wind tunnel in accordance with an illustrative embodiment.

Reference to FIG. 4, an illustration of a test article for testing in a wind tunnel is depicted in accordance with an illustrative embodiment. In this illustrative example, test article 400 is held by mounting system 401 and can be positioned in a wind tunnel for testing. In this example, mounting system 401 is an example of identification for mounting system 330 and FIG. 3. Mounting system 401 is selected to enable positioning test article 400 in different orientations. For example, test article 400 can be rotated about axis 403. In this example, axis 403 extends centrally through test article 400. This mounting system can also be used to rotate test article 400 about axis 404. Laser beams can be emitted and received using a laser sensor system at these and other orientations.

Figure 5A:
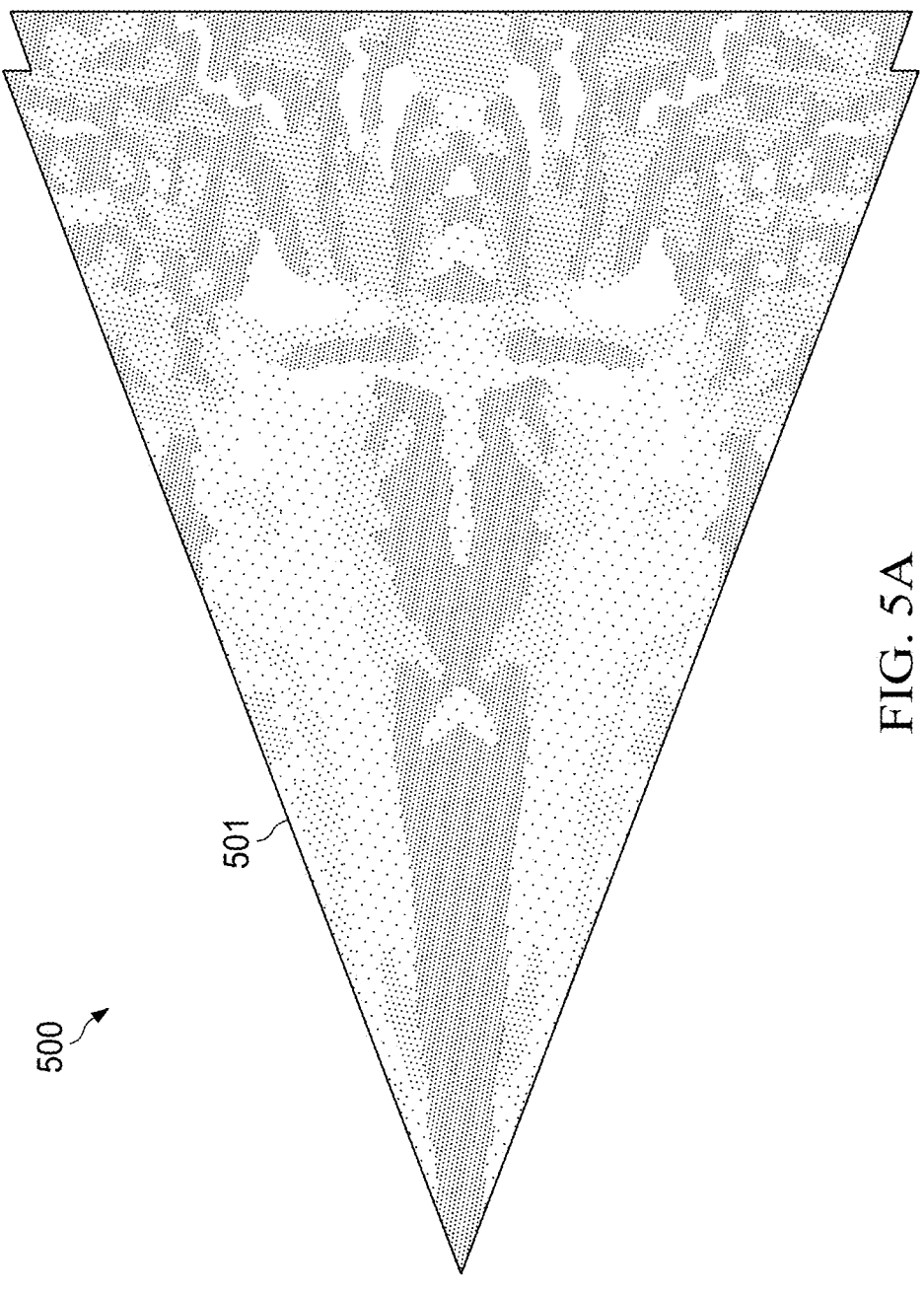
FIGS. 5A-5C are illustrations of air turbulence over a test article at different orientations in accordance with an illustrative embodiment.
Figure 5B:
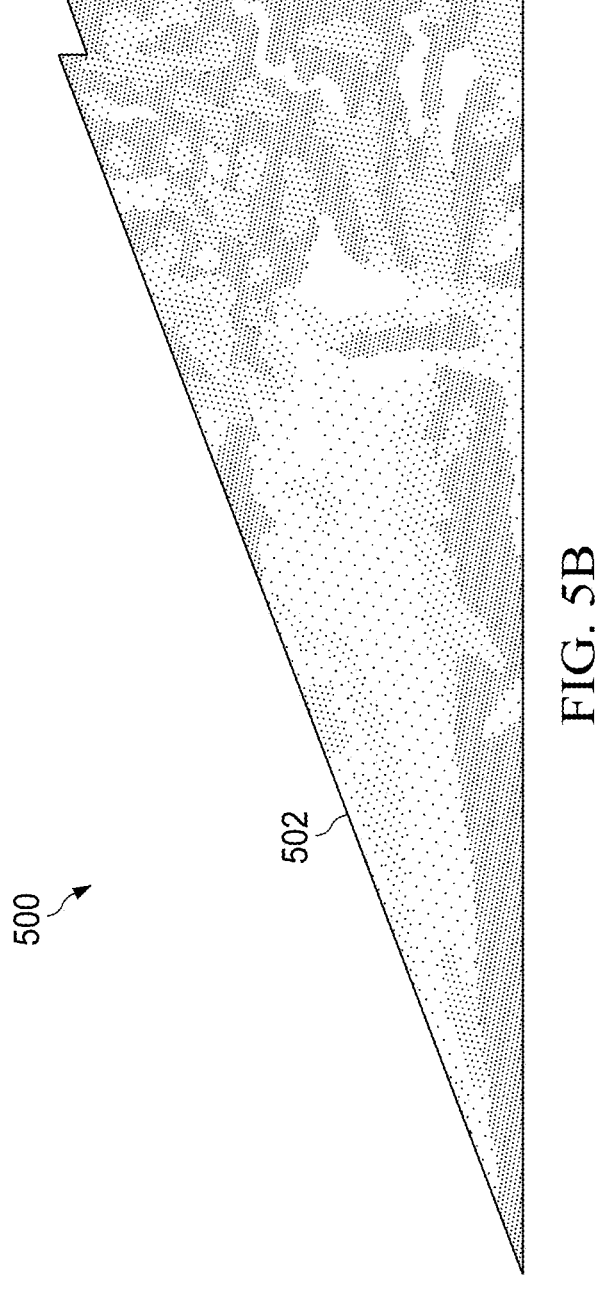
Figure 5C:
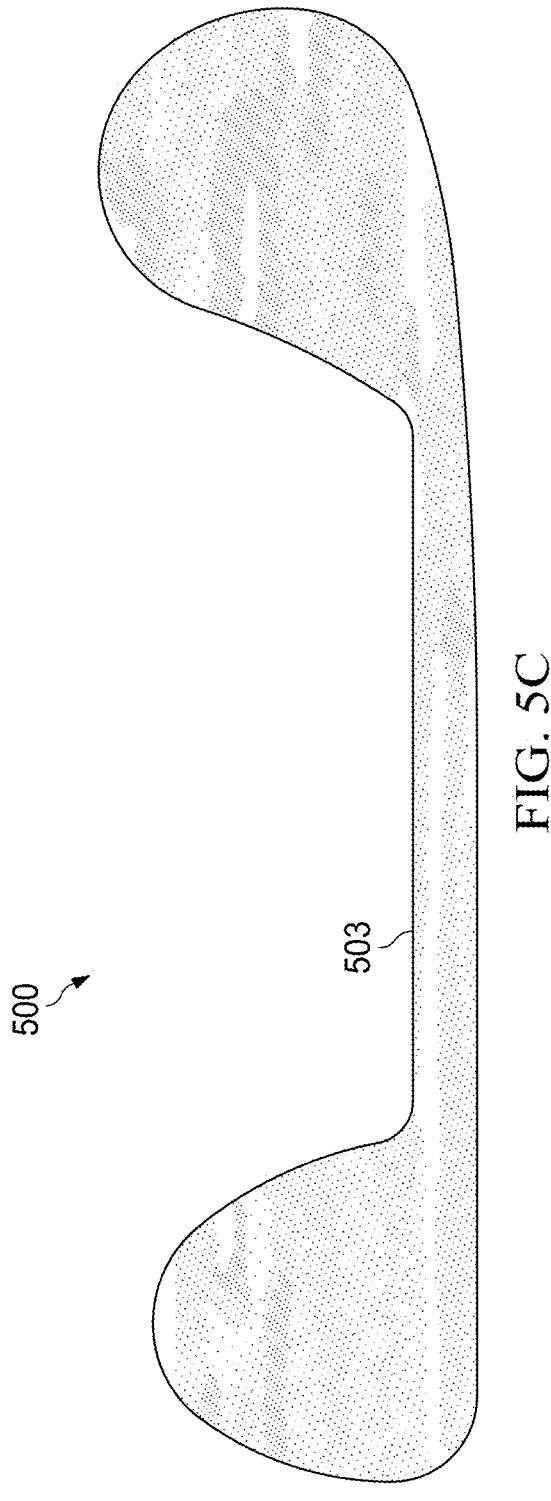

With reference next to FIGS. 5A-5C, illustrations of air turbulence for a test article at different orientations are depicted in accordance with an illustrative embodiment. In this illustrative example, displays 500 are examples of displays of air turbulence for test article 400 in FIG. 4. Each of these displays can be an example of display 350 and display system 358 in FIG. 3.

In this example, displays 500 includes top view 501, side view 502, and front view 503 of air turbulence for test article 400 occurring during testing of test article 400 in a wind tunnel. In this example, top view 501 and side view 502 are generated from rotating test article 400 about axis 403 in FIG. 4. Front view 503 is generated from rotating test article 400 about axis 404 in FIG. 4.

In displays 500, the different displays of turbulence are generated from rotating test article 400 by 90°. In other illustrative examples, other amounts of rotation can be used such as 10°, 30°, or some other amount of rotation. In addition, off-axis rotations could be implemented to provide another layer of information about the turbulent airflow.

Figure 6:
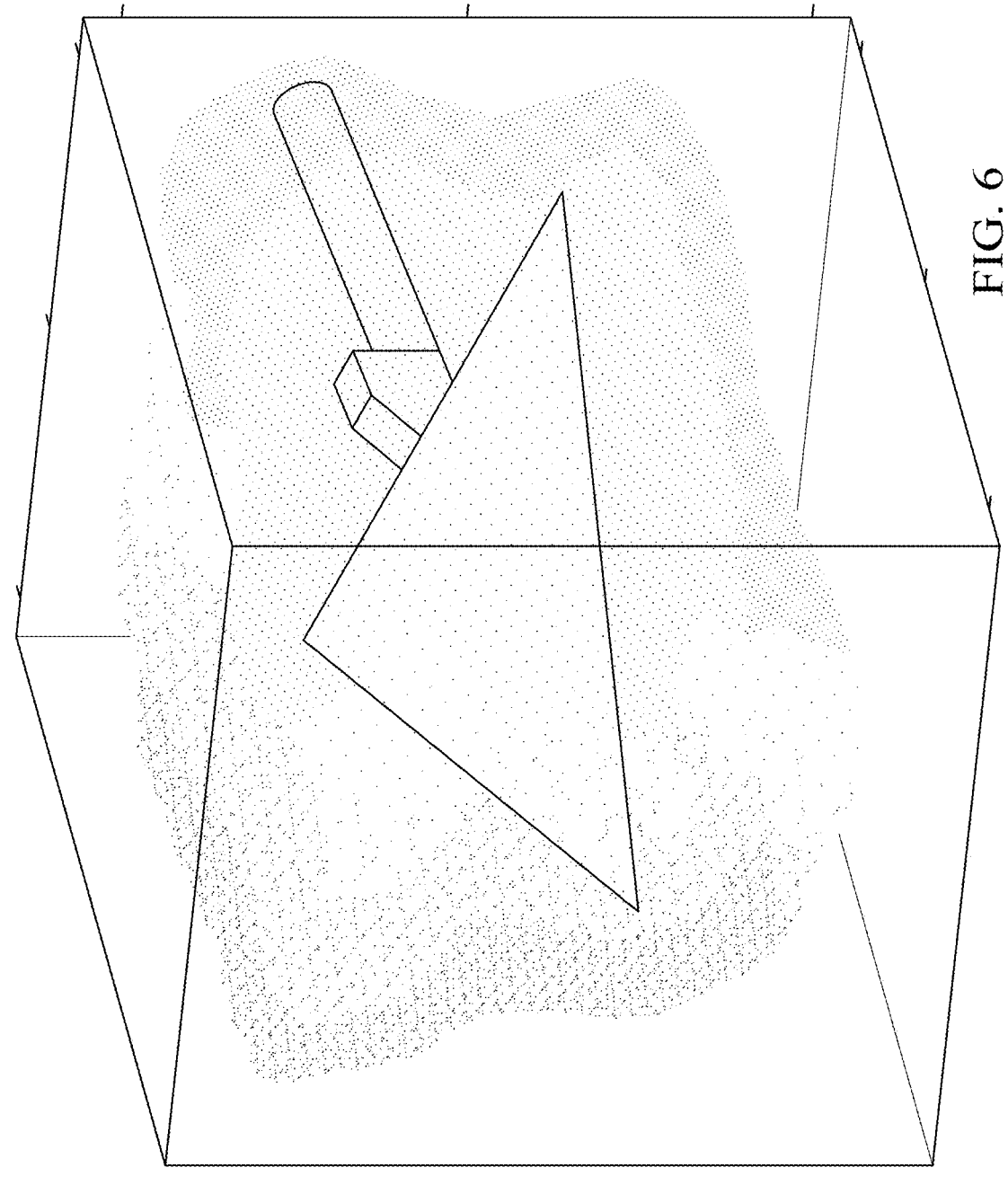
FIG. 6 is an illustration of a three-dimensional display of a test article in accordance with an illustrative embodiment.

With reference now to FIG. 6, an illustration of a three-dimensional display of a test article is depicted in accordance with an illustrative embodiment. In this illustrative example, display 600 is a three-dimensional display of air turbulence for test article 400. This three-dimensional display can be generated from displays 500 in FIGS. 5A-5C.

Turning next to FIG. 7, an illustration of a flowchart of a process for measuring turbulence in a wind tunnel is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in controller 214 in computer system 212 in FIG. 2.

The process begins by emitting laser beams by a laser sensor system from transmitter locations in a wind tunnel at receiver locations (operation 700). The process detects the laser beams by the laser sensor system at the receiver locations (operation 702).

The process determines beat frequencies of the laser beams detected at the receiver locations (operation 704). The process determines air turbulence in the wind tunnel for the receiver locations using the beat frequencies (operation 706). The process terminates thereafter.

With reference now to FIG. 8, an illustration of a flowchart of a process for positioning components in a sensor system to emit and receive laser beams is depicted in accordance with an illustrative embodiment. The process in this figure is an example of additional operations that can be performed with the operations in FIG. 7. In this example, the laser sensor system comprises a laser transmitter system configured to emit the laser beams from the transmitter locations in the wind tunnel at the receiver locations and an optical receiver system configured to detect the laser beams at the receiver locations. In this example, the positioning can be performed by the controller controlling a positioning system.

The process positions the laser transmitter system at the transmitter locations to emit the laser beams at the receiver locations (operation 800). The process positions the optical receiver system at the receiver locations corresponding to the transmitter locations to receive the laser beams emitted from the transmitter locations (operation 802). The process terminates thereafter.

Figure 9:
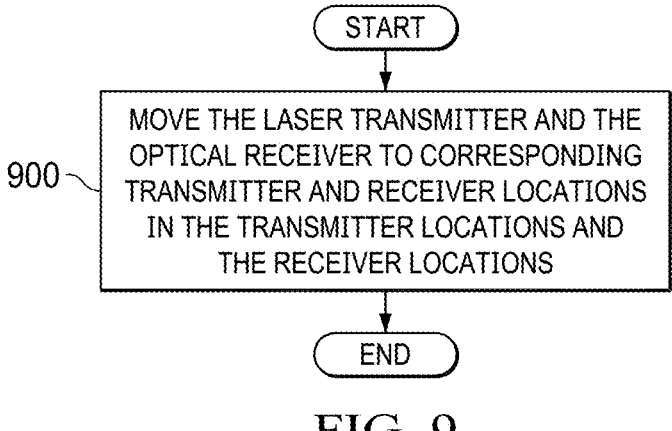
FIG. 9 is an illustration of a flowchart of a process for positioning a laser transmitter and an optical receiver in accordance with an illustrative embodiment.

Next in FIG. 9, an illustration of a flowchart of a process for positioning a laser transmitter and an optical receiver is depicted in accordance with an illustrative embodiment. The process in this figure is an example of an additional operation that can be performed with the operations in FIG. 8. In this example, the laser transmitter system comprises a laser transmitter and the optical receiver system comprises an optical receiver.

The process moves the laser transmitter and the optical receiver to corresponding transmitter and receiver locations in the transmitter locations and the receiver locations (operation 900). The process terminates thereafter. In operation 900, corresponding locations can be such that the transmitter location has the same xy coordinate as the receiver location when the locations identified using a Cartesian coordinate system.

Figure 10:
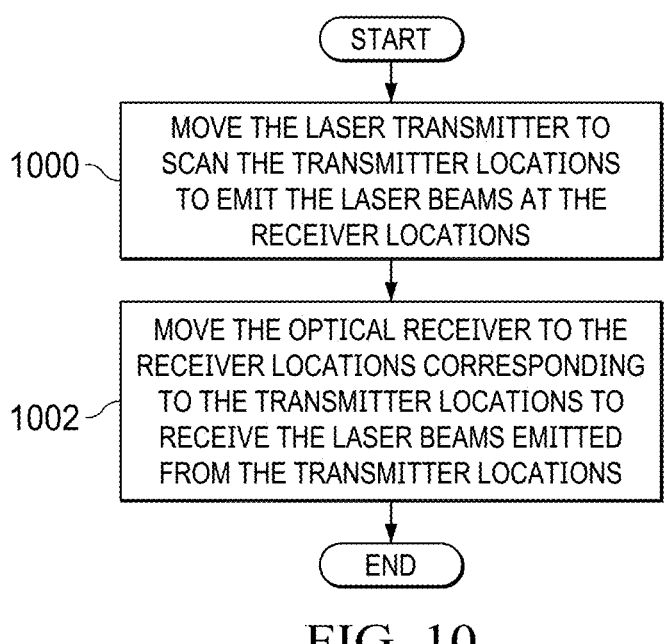
FIG. 10 is an illustration of a flowchart of a process for positioning a laser transmitter and an optical receiver in accordance with an illustrative embodiment.

Turning next to FIG. 10, an illustration of a flowchart of a process for positioning a laser transmitter and an optical receiver is depicted in accordance with an illustrative embodiment. The process in this figure is an example of additional operations that can be performed with the operations in FIG. 8. In this example, the laser transmitter system comprises a laser transmitter and the optical receiver system comprises an optical receiver.

The process moves the laser transmitter to scan the transmitter locations to emit the laser beams at the receiver locations (operation 1000). The process moves the optical receiver to the receiver locations corresponding to the transmitter locations to receive the laser beams emitted from the transmitter locations (operation 1002). The process terminates thereafter.

Figure 11:
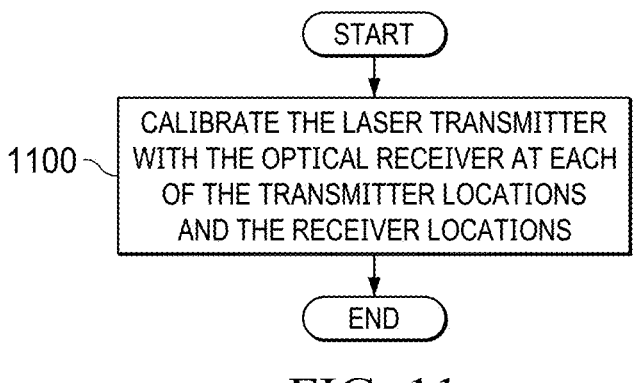
FIG. 11 is an illustration of a flowchart of a process for forming calibration for a sensor system in accordance with an illustrative embodiment.

With reference now to FIG. 11, an illustration of a flowchart of a process for forming calibration for a sensor system is depicted in accordance with an illustrative embodiment. The process in this figure is an example of an additional operation that can be performed with the operations in FIG. 9. In this example, the laser transmitter system comprises a laser transmitter and the optical receiver system comprises an optical receiver.

The process calibrates the laser transmitter with the optical receiver at each of the transmitter locations and the receiver locations (operation 1100). The process terminates thereafter.

Figure 12:
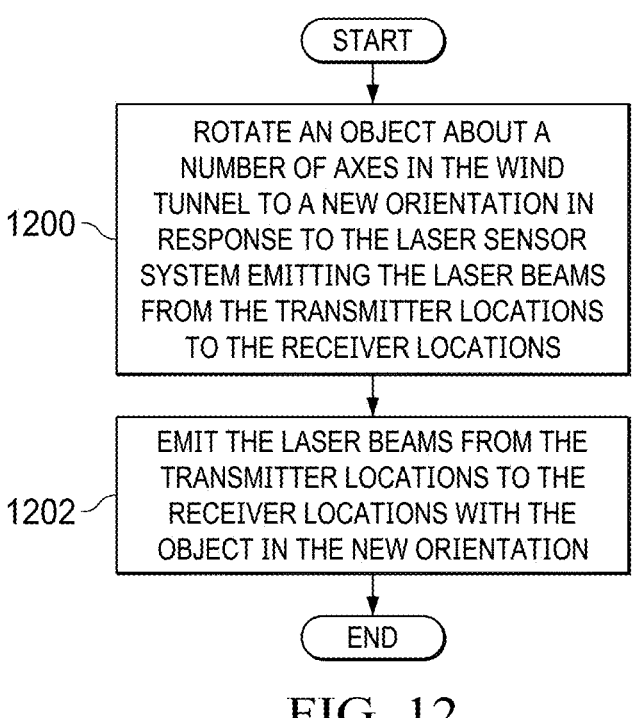
FIG. 12 is an illustration of a flowchart of a process for positioning a laser transmitter and an optical receiver in accordance with an illustrative embodiment.

Turning next to FIG. 12, an illustration of a flowchart of a process for positioning a laser transmitter and an optical receiver is depicted in accordance with an illustrative embodiment. The process in this figure is an example of additional operations that can be performed with the operations in FIG. 7.

The process rotates an object about a number of axes in the wind tunnel to a new orientation in response to the laser sensor system emitting the laser beams from the transmitter locations to the receiver locations (operation 1200). The process emits the laser beams from the transmitter locations to the receiver locations with the object in the new orientation (operation 1202). The process terminates thereafter.

Figure 13:
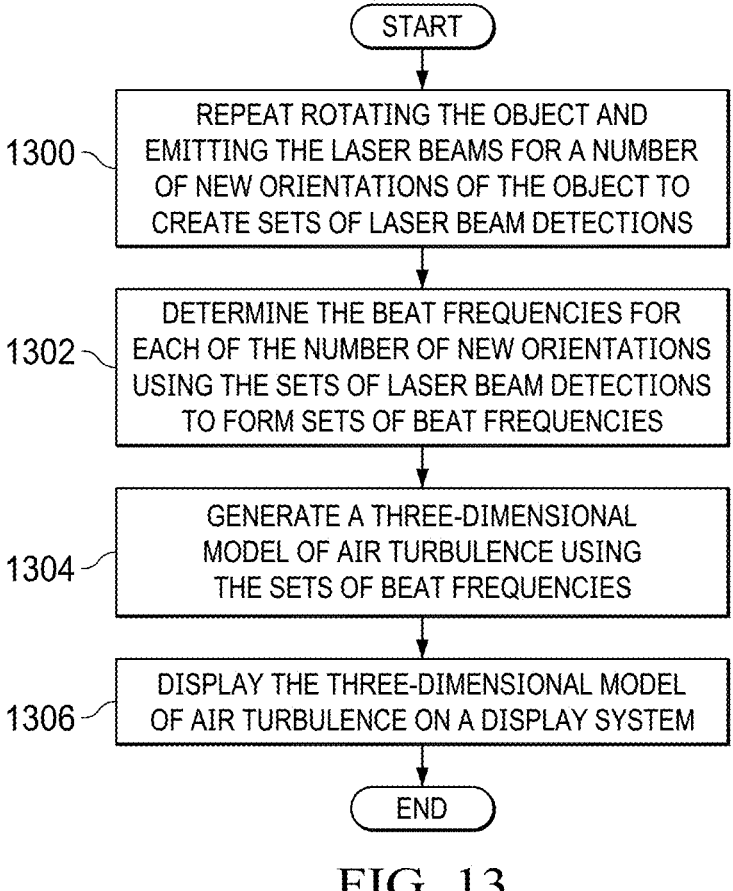
FIG. 13 is an illustration of a flowchart for generating sensor data from different orientations of an object in accordance with an illustrative embodiment.

With reference to FIG. 13, an illustration of a flowchart for generating sensor data from different orientations of an object is depicted in accordance with an illustrative embodiment. The process in this figure is an example of additional operations that can be performed with the operations in FIG. 12.

The process repeats rotating the object and emitting the laser beams for a number of new orientations of the object to create sets of laser beam detections (operation 1300). The process determines the beat frequencies for each of the number of new orientations using the sets of laser beam detections to form sets of beat frequencies (operation 1302).

The process generates a three-dimensional model of air turbulence using the sets of beat frequencies (operation 1304). The process displays the three-dimensional model of air turbulence on a display system (operation 1306). The process terminates thereafter.

Figure 14:
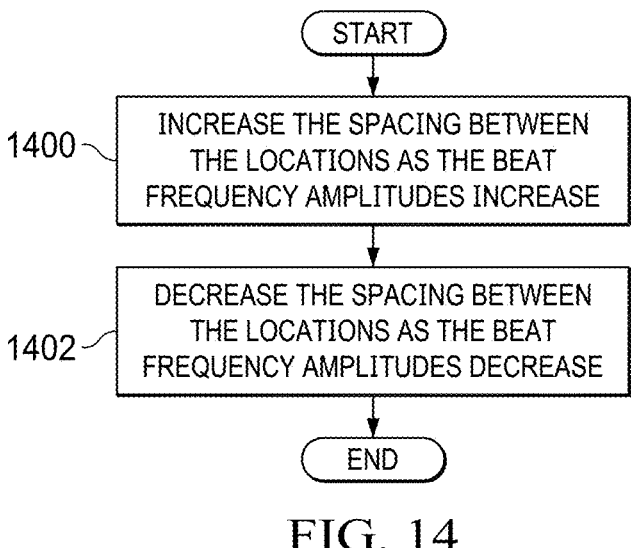
FIG. 14 is an illustration of a flowchart of a process for selecting spacing for transmitter locations and receiver locations in accordance with an illustrative embodiment.

With reference now to FIG. 14, an illustration of a flowchart of a process for selecting spacing for transmitter locations and receiver locations is depicted in accordance with an illustrative embodiment. The process in this figure is an example of additional operations that can be performed with the operations in FIG. 7. In this example, a spacing between locations in the transmitter locations and the receiver locations corresponding to the transmitter locations is selected on an amount of air turbulence detected. The air turbulence is represented by the beat frequency amplitudes determined for the receiver locations.

The process increases the spacing between the locations as the beat frequency amplitudes increase (operation 1400). The process decreases the spacing between the locations as the beat frequency amplitudes decrease (operation 1402). The process terminates thereafter.

In FIG. 15, an illustration of a flowchart of a process for displaying air turbulence is depicted in accordance with an illustrative embodiment. The operations in this flowchart are examples of additional operations that can be performed with the operations in FIG. 7.

The process maps the air turbulence at the receiver locations to pixels (operation 1500). The process determines pixel properties using the air turbulence (operation 1502).

The process displays the pixels with the pixel properties on a display system to form a display of the air turbulence (operation 1504). The process terminates thereafter.

Turning to FIG. 16, an illustration of a flowchart of process for interfering the laser beams is depicted in accordance with an illustrative embodiment. The process in this figure is an example of an additional operation that can be performed with the operations in FIG. 7. The process interferes a portion of the laser beams emitted with the laser beams received at the receiver locations to generate the beat frequencies for the receiver locations (operation 1600). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

The illustrative examples in FIGS. 1-16 are implemented using a heterodyne laser sensor system. Those examples are directed toward detecting air turbulence in the wind tunnel using laser beams with different frequencies to determine beat frequencies 235. These depicted examples are implemented using laser sensor system 220 in the form of a heterodyne laser sensor system 223 in which interference of light from two laser beams with different frequencies is performed to obtain a beat frequency for analysis to determine air turbulence. The examples in these figures are not meant to limit the manner in which other illustrative examples can be implemented.

Other illustrative examples can be implemented using other types of laser sensor systems. For example, a laser sensor system can be implemented using a homodyne laser sensor system.

Figure 17:
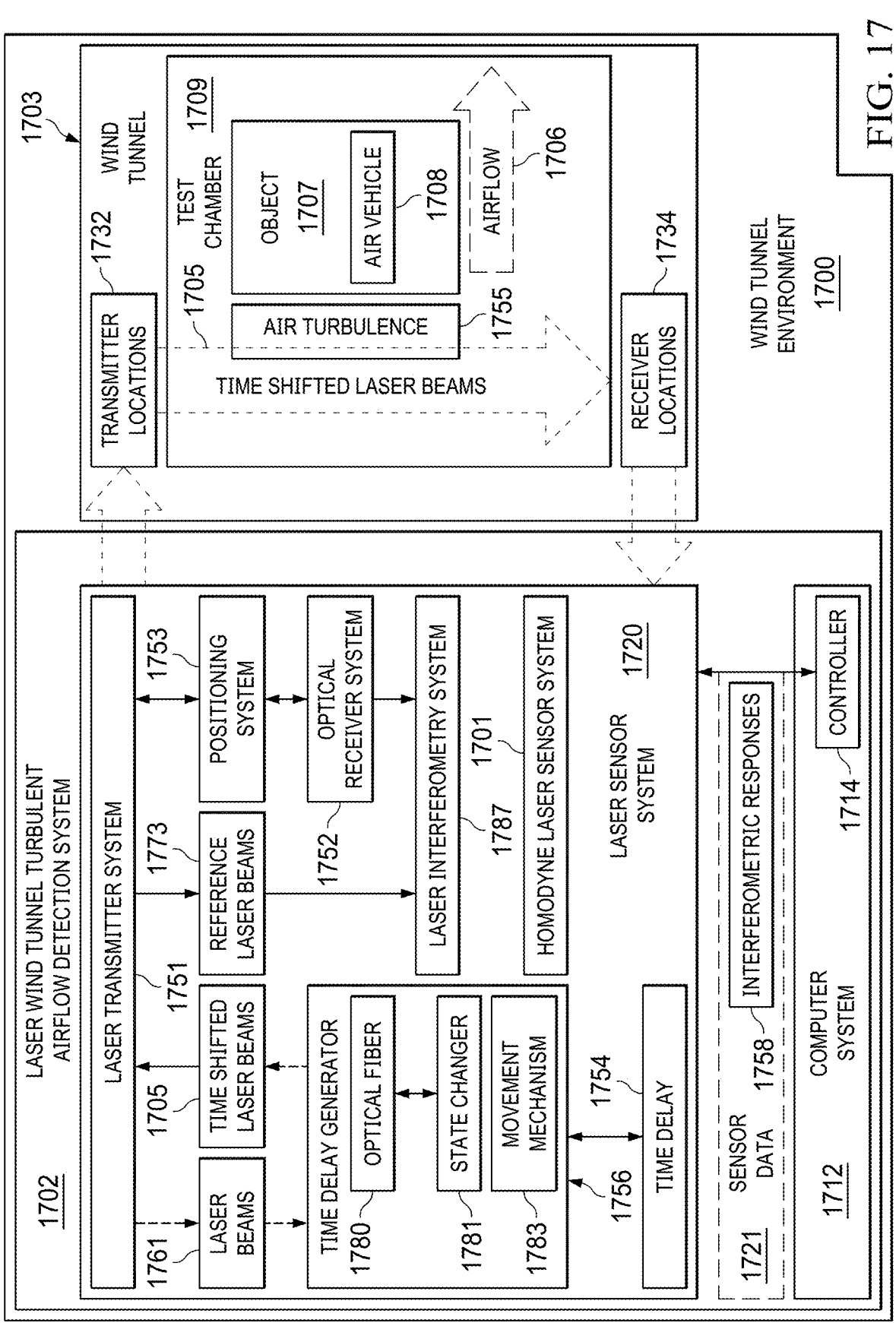
FIG. 17 is an illustration of a block diagram of a wind tunnel environment in accordance with an illustrative embodiment.

With reference now to FIG. 17, an illustration of a block diagram of a wind tunnel environment is depicted in accordance with an illustrative embodiment. In this illustrative example, laser sensor system 1720 in laser wind tunnel turbulent airflow detection system 1702 in wind tunnel environment 1700 is in the form of homodyne laser sensor system 1701.

With this example, laser sensor system 1720 is configured to generate laser beams 1761 and generate reference laser beams 1773 from laser beams 1761. In this example, reference laser beams 1773 can be a portion of the laser beams 1761.

For example, a laser beam in laser beams 1761 can be used for transmission from a transmitter location in transmitter locations 1732 to a receiver location in receiver locations 1734. In this example, a portion of this laser beam can be shifted in time to form a time shifted laser beam in time shifted laser beams 1705. The other portion of this laser beam can be split out and used to generate a reference laser beam in reference laser beams 1773.

Laser sensor system 1720 introduces time delay 1754 in laser beams 1761 to form time shifted laser beams 1705. In this example, the time shifting of laser beams 1761 occurs after reference laser beams 1773 are generated from laser beams 1761. Laser sensor system 1720 emits time shifted laser beams 1705 in wind tunnel 1703 from transmitter locations 1732. In this example, time shifted laser beams 1705 are emitted in test chamber 1709 in wind tunnel 1703.

Laser sensor system 1720 receives time shifted laser beams 1705 at receiver locations 1734. Laser sensor system 1720 interferes reference laser beams 1773 with time shifted laser beams 1705 received at receiver locations 1734 to generate interferometric responses 1758.

In the illustrative example, time delay 1754 is selected to cause interferometric responses 1758 to have the greatest sensitivity to changes in phase shifts of time shifted laser beams 1705 passing through the wind tunnel 1703. In this example, the phase shift is between a time shifted laser beam and a reference laser beam. The phase shift is a result of time delay 1754 applied to a laser beam to form a time shifted laser beam. For example, time delay 1754 can shift the phase of reference laser beams passing through the wind tunnel 1703 by $\pi/2$ radians or $90°$.

In this example, interferometric responses 1758 are sent as sensor data 1721 to controller 1714 in computer system 1712. Interferometric responses 1758 correlate with air turbulence 1755 that time shifted laser beams 1705 pass through in wind tunnel 1703.

In this example, controller 1714 can be implemented in software, hardware, firmware or a combination thereof in the same manner as 214 in FIG. 2. In this example, controller 1714 emits time shifted laser beams 1705 in wind tunnel 1703 from transmitter locations 1732 to receiver locations 1734 using laser sensor system 1720. Controller 1714 determines air turbulence 1755 in wind tunnel 1703 for receiver locations 1734 using interferometric responses 1758.

As depicted, the emission of time shifted laser beams 1705 can be performed while object 1707 such as air vehicle 1708 is being tested within test chamber 1709 of wind tunnel 1703. In this example, air turbulence 1755 can result from airflow 1706 over object 1707 in test chamber 1709 in wind tunnel 1703.

In this illustrative example, time delay generator 1756 introduces time delay 1754 in laser beams 1761 to form time shifted laser beams 1705. Controller 1714 controls time delay 1754 using time delay generator 1756.

In these examples, time delay generator 1756 can change time delay 1754 in a number of different ways. In one illustrative example, time delay generator 1756 can comprise optical fiber 1780 and state changer 1781. State changer 1781 is a device that can change the state of laser beams traveling through optical fiber 1780. The state can be changed in a number of different ways. For example, state changer 1781 can change time delay 1754 by at least one of physically changing a length of optical fiber 1780, applying a stress to optical fiber 1780, changing a temperature of optical fiber 1780, or applying a static field to optical fiber 1780. In this example, state changer 1781 can change the optical path length of optical fiber 1780 using at least one of heat or pressure.

In this example, the optical path length of optical fiber 1780 can be changed by an optical fiber stretcher which is a device that can change the length of optical fiber 1780. Stress and length can also be changed by at least one of twisting, bending, or curling optical fiber 1780. The static field can be at least one of a static electric field or static magnetic field.

In another illustrative example, time delay 1754 can be changed by movement mechanism 1783. With this example, movement mechanism 1783 can move a laser generating laser beams forward or backward in a direction of laser beam emissions. The laser is a hardware device that generates a laser beam. For example, movement mechanism 1783 can be a piezoelectric stage that moves the laser generating laser beams 1761.

In this illustrative example, laser sensor system 1720 includes laser transmitter system 1751 which is a hardware system that transmits time shifted laser beams 1705 from transmitter locations 1732. Further, laser sensor system 1720 also includes optical receiver system 1752.

In this illustrative example, laser sensor system 1720 also includes laser interferometry system 1787. Laser interferometry system 1787 is a hardware system and operates to determine interferometric responses 1758 using reference laser beams 1773 and time shifted laser beams 1705 received at the receiver locations 1734. The laser beam received at receiver locations is combined or interfered with the reference laser beam.

In these examples, this reference laser beam can be a portion of the laser beam while the other portion of the laser beam is time shifted to form the time shifted laser beam. Interferometric responses 1758 form sensor data 1721. The sensor data 1721 is sent to controller 1714 for processing.

In these illustrative examples, components in laser sensor system 1720 such as laser transmitter system 1751, optical receiver system 1752, and positioning system 1753 can be implemented using components such as those for laser transmitter system 251, optical receiver system 252, and positioning system 253 depicted in FIG. 3.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, laser interferometry system 1787 can be a separate component from laser sensor system 1720. For example, laser interferometry system 1787 can be component in communication with laser sensor system 1720 and controller 1714.

In another illustrative example, introducing time delay 1754 into laser beams 1761 can be omitted. In this example, a laser sensor system 1720 generates laser beams 1761 and generates reference laser beams 1773 from laser beams 1761. With this example, laser sensor system 1720 emits laser beams 1761 in wind tunnel 1703 from transmitter locations 1732. Further, with this example, time shifted laser beams 1705 do not need to be used to determine air turbulence 1755.

Laser sensor system 1720 receives laser beams 1761 at receiver locations 1734. Further, laser sensor system 1720 interferes reference laser beams 1773 with laser beams 1761 received at receiver locations 1734 to generate interferometric responses 1758.

In this example, controller 1714 emits laser beams 1761 in wind tunnel 1703 from transmitter locations 1732 to receiver locations 1734 using laser sensor system 1720. Controller 1714 determines air turbulence 1755 in wind tunnel 1703 for receiver locations 1734 using interferometric responses 1758.

Figure 18:
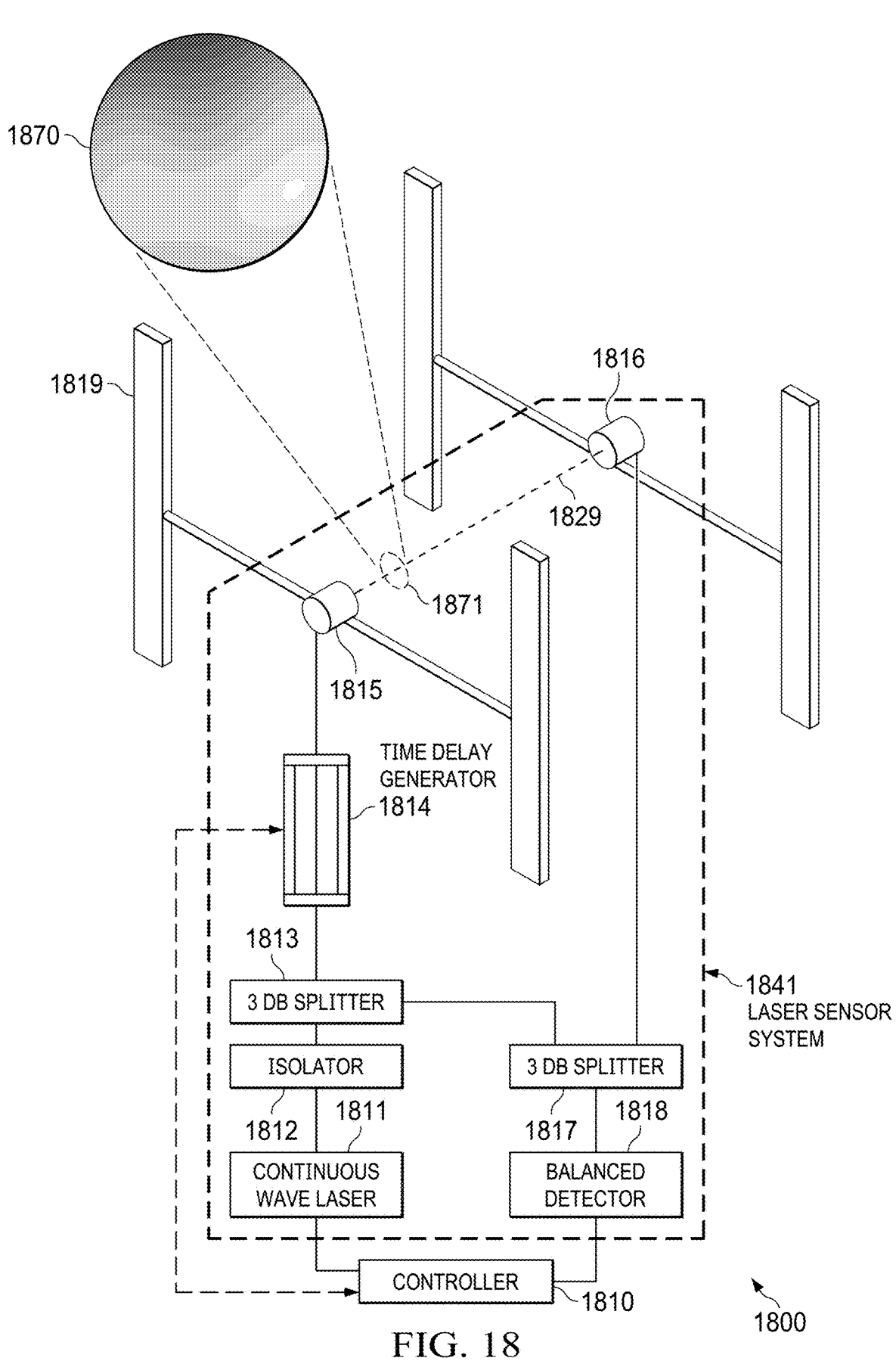
FIG. 18 is an illustration of a schematic diagram of a laser sensor system in accordance with an illustrative embodiment.

Turning now to FIG. 18, an illustration of a schematic diagram of a laser sensor system is depicted in accordance with an illustrative embodiment. In this illustrative example, laser wind tunnel turbulent airflow detection system 1800 is an example of an implementation for laser wind tunnel turbulent airflow detection system 1702 in FIG. 17.

As depicted, laser wind tunnel turbulent airflow detection system 1800 comprises laser sensor system 1841 and controller 1810. Laser sensor system 1841 is an example of an implementation for laser sensor system 1720 in FIG. 17. Controller 1810 is an example of an implementation for controller 1714 in FIG. 17.

As depicted, the system includes controller 1810, continuous wave laser 1811, isolator 1812, 3 dB splitter 1813, time delay generator 1814, laser transmitter 1815, optical receiver 1816, 3 dB splitter 1817, balanced detector 1818, and positioning system 1819.

In this example, continuous wave laser 1811, isolator 1812, 3 dB splitter 1813, time delay generator 1814, and laser transmitter 1815 can be connected using optical fibers. Optical receiver 1816, 3 dB splitter 1817, and balanced detector 1818 can also be connected to each other using optical fibers. Balanced detector 1818 can be connected to controller 1810 by a wire or optical connection. Further in this example, controller 1810 can be connected to continuous wave laser and positioning system 1819 using a wire or optical fiber. In these examples, when optical fibers are used to connect components, the optical fibers are single mode optical fibers. Further, in the different illustrative examples, the optic fibers can be polarization maintaining fibers to maintain the polymerization of the laser beams. In this manner, the interference between the time shifted laser beam and the reference laser beam can be maximized. In this example, positioning system 1819 is controlled by controller 1810. In this example, positioning system 1819 can position laser transmitter 1815 and optical receiver 1816 at different locations. In this example, these two components can be moved to have the same xy coordinates in a Cartesian coordinate system. The xy coordinates for laser transmitter 1815 can be said to correspond to the xy coordinates for optical receiver 1816.

Continuous wave laser 1811 emits a continuous laser beam. In this example, the laser beam passes through isolator 1812.

As depicted, 3 dB splitter 1813 splits a portion of the laser beam and sends that portion back into 3 dB splitter 1817. A 3 dB splitter is a hardware device that divides or splits and optical signal such as the laser beam emitted by continuous wave laser 1811.

The other portion of this laser beam is sent through time delay generator 1814 which operates to control the time delay of the laser beam. The laser beam at the time delay is sent through laser transmitter 1815 and emitted as time shifted laser beam 1829. In this example, time shifted laser beam 1829 can travel through air turbulence 1870 at location 1871 in a wind tunnel. Air turbulence 1870 can change the optical path length that time shifted laser beam 1829 travels. In this example, different portions of time shifted laser beam 1829 can have different optical paths when traveling through air turbulence 1870 at location 1871. In these illustrative examples, the time shifting of the laser beam to form the time shifted laser beam 1829 results in a phase shift. In these illustrative examples, the time shift can be selected to be different values. In these examples, the current shift is selected to avoid a differential phase shift of at or near a multiple of II radians. The differential phase shift that is near a multiple of π radians starting at π/2 radians can be selected based on a desired level of power fluctuations. In other words, the differential phase shift can be selected to increase the amplitude of power fluctuations. That selection enables increasing detection of air turbulence. As the phase shift is closer to a multiple of π radians starting a π/2 radians, the ability to detect air turbulence is increased. For example, the closer the phase difference is to 0, π, 2, 3π, etc., the lower the sensitivity. The closer the phase difference is to π/2, 3π/2, 5π/2, etc., the higher the sensitivity.

The time shifted laser beam 1829 is received by optical receiver 1816, which is connected to 3 dB splitter 1817. In this example, 3 dB splitter 1817 interferes time shifted laser beam 1829 as received by optical receiver 1816 with the portion of the original laser beam emitted by continuous wave laser 1811. Time shifted laser beam 1829 as received by optical receiver 1816 has a time delay from the portion of the laser beam split by 3 dB splitter 1813 into 3 dB splitter 1817. These two laser beams are split by 3 dB splitter 1817. In this manner, the laser sensor system is a homodyne laser sensor system in which interference of light from laser beams with time delays is performed to generate an interferometric response that can be measured in terms of power.

In this illustrative example, balanced detector 1818 measures the optical power in the interferometric response and generates sensor data for the interferometric response as a measurement of power. This interferometric response as measured by power is sent to controller 1810.

In this example, controller 1810 can be a server computer, laptop computer, a tablet computer, a mobile phone, or other hardware system that can control the operation of the different components in laser wind tunnel turbulent airflow detection system 1800. In addition to controlling the operation of these components, controller 1810 can also analyze the sensor data interferometric responses received in signals from balanced detector 1818. In these examples, the power measured increases as the amount of turbulence increases. When air turbulence is not present, a baseline level of power measurement is present. This baseline level can be a flatline. When air turbulence is present, the power measured varies from the baseline. The peaks or different levels of power measurements can be used to determine the level of air turbulence for a particular location being measured in the wind tunnel.

As another example, the interferometric response can also include phase fluctuations in addition to measuring power. Phase fluctuations can be present when two laser beams are interfered with each other. Phase fluctuations can be measured by sensors such as a photodiode that measures interference in the form of power. These phase fluctuations can be measured indirectly by taking a fast Fourier transform of power over time caused by the phase fluctuations. Fast Fourier transform provides information on the frequency content of the signal. In this example, the signal is the turbulent flow. The fast Fourier transform can provide information about the frequencies in the turbulent airflow that are changing.

Figure 19:
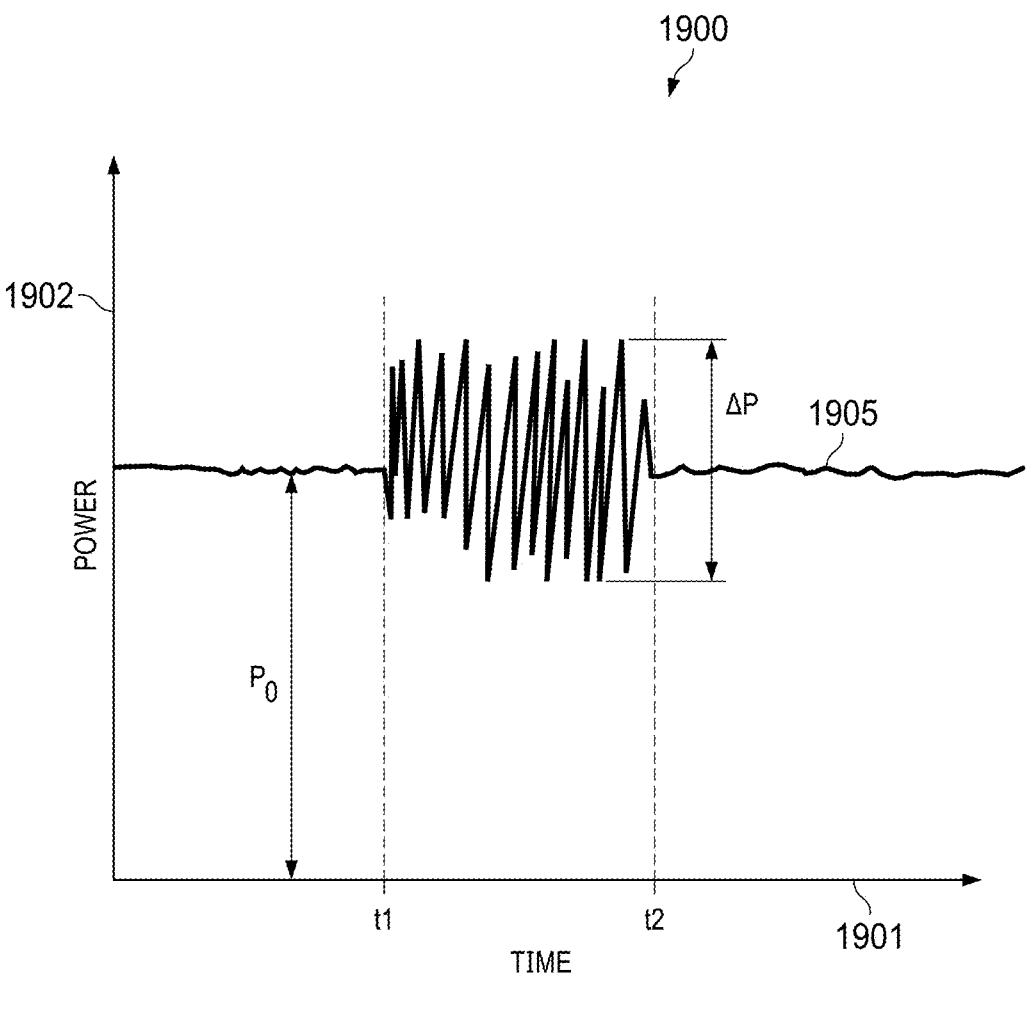
FIG. 19 is an illustration of power measurements made over time in response to air turbulence in accordance with an illustrative embodiment.

Turning now to FIG. 19, an illustration of power measurements made over time in response to air turbulence is depicted in accordance with an illustrative embodiment. As depicted, graph 1900 is a graph of air turbulence. In this example, x-axis 1901 is time and y-axis 1902 is power.

In this example, line 1905 represents a measurement of power over time. As depicted, when air turbulence is not present, line 1905 has a value of Po. This measurement of power results from combining the reference laser beam with the time shifted laser beam without the time shifted laser beam traveling through air turbulence. In this example, air turbulence is present from time t1 to time t2. In this example, ΔP is the lowest power to the highest power in this example. Power deviation (PD) can be determined using ΔP and Po as follows:

$$PD=\Delta P/Po$$

This power deviation represents the amount of air turbulence. As the power deviation increases, the amount of turbulence increases.

In other examples, this measurement of deviation represented by ΔP can be measured in other manners. For example, an average height over a period of time, or a half power measurement can be used for ΔP. This type of measurement can be made for each receiver location to generate measurements of air turbulence in the wind tunnel.

Figure 20:
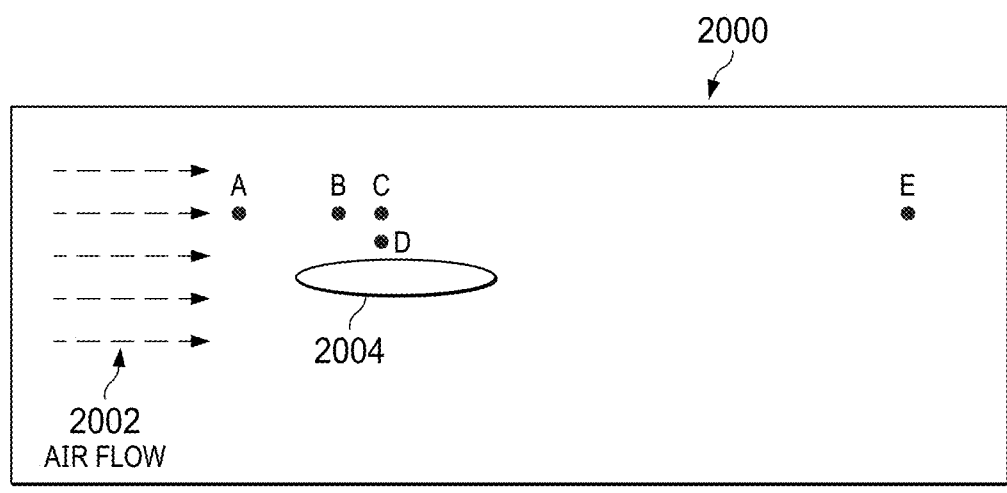
FIG. 20 is an illustration of receiver locations in points with an illustrative embodiment.

With reference next to FIG. 20, an illustration of receiver locations is depicted in points with an illustrative embodiment. In this illustrative example, receiver locations 2000 are locations where measurements can made of time shifted laser beams that are transmitted to those receiver locations from transmitter locations. In this illustrative example, receiver locations 2000 can be described using xy coordinates in a Cartesian coordinate system. These receiver locations can also be referred to as measurement locations in which these measurement locations correspond to pixels for use in displaying the air turbulence.

As depicted, receiver locations 2000 comprises A, B, C, D, and E. In this example, these different receiver locations are in locations that are described using xy coordinates in a Cartesian coordinate system.

In this example, airflow 2002 flows over object 2004. With this example, air turbulence is present at receiver locations B, C, and D. Air turbulence is absent at receiver locations A and E. Measurements of power for time shifted laser beams received at receiver locations B, C, and D are greater than those at receiver locations A and E. In this example, air turbulence is absent at receiver locations A and E.

Figure 21:
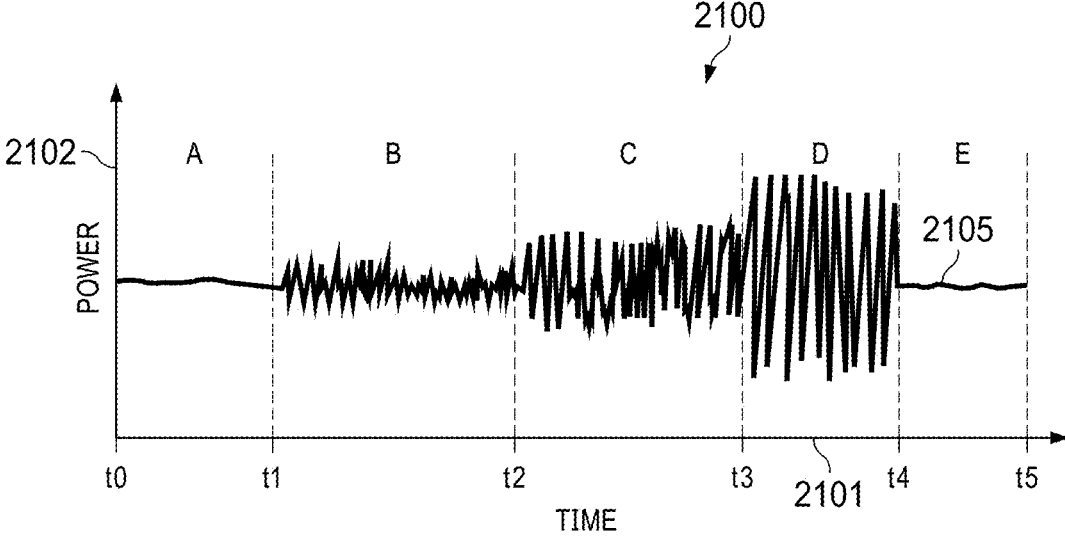
FIG. 21 is an illustration of power measurements made over time in response to air turbulence for different receiver locations in accordance with an illustrative embodiment.

Turning now to FIG. 21, an illustration of power measurements made over time in response to air turbulence for different receiver locations is depicted in accordance with an illustrative embodiment. As depicted, graph 2100 is a graph of air turbulence. In this example, x-axis 2101 is time and y-axis 2102 is power.

In this example, line 2105 represents a measurement of power over time. In this example, the optical receiver is moved to receiver locations A, B, C, D, and E. These receiver locations correspond to receiver locations 2000 as depicted in FIG. 20.

In this example, the transmitter is moved to the same corresponding coordinates xy coordinates for optical receiver locations to transmit time shifted laser beams. This movement is performed over time as shown in graph 2100. In this example, power measurements are made at receiver location A from time t0 to time t1; power measurements are made at receiver location B from time t1 to time t2; power measurements are made at receiver location C from time t2 to time t3; power measurements are made at receiver location D from time t3 to time t4; and power measurements are made at receiver location E from time t4 to time t5.

As depicted, air turbulence is absent in receiver location A and E. Air turbulence is present and receiver locations B, C, D with receiver location D having the greatest amount of air turbulence, receiver location C having the next greatest amount of air turbulence, and receiver location B having the least amount of air turbulence.

Figure 22:
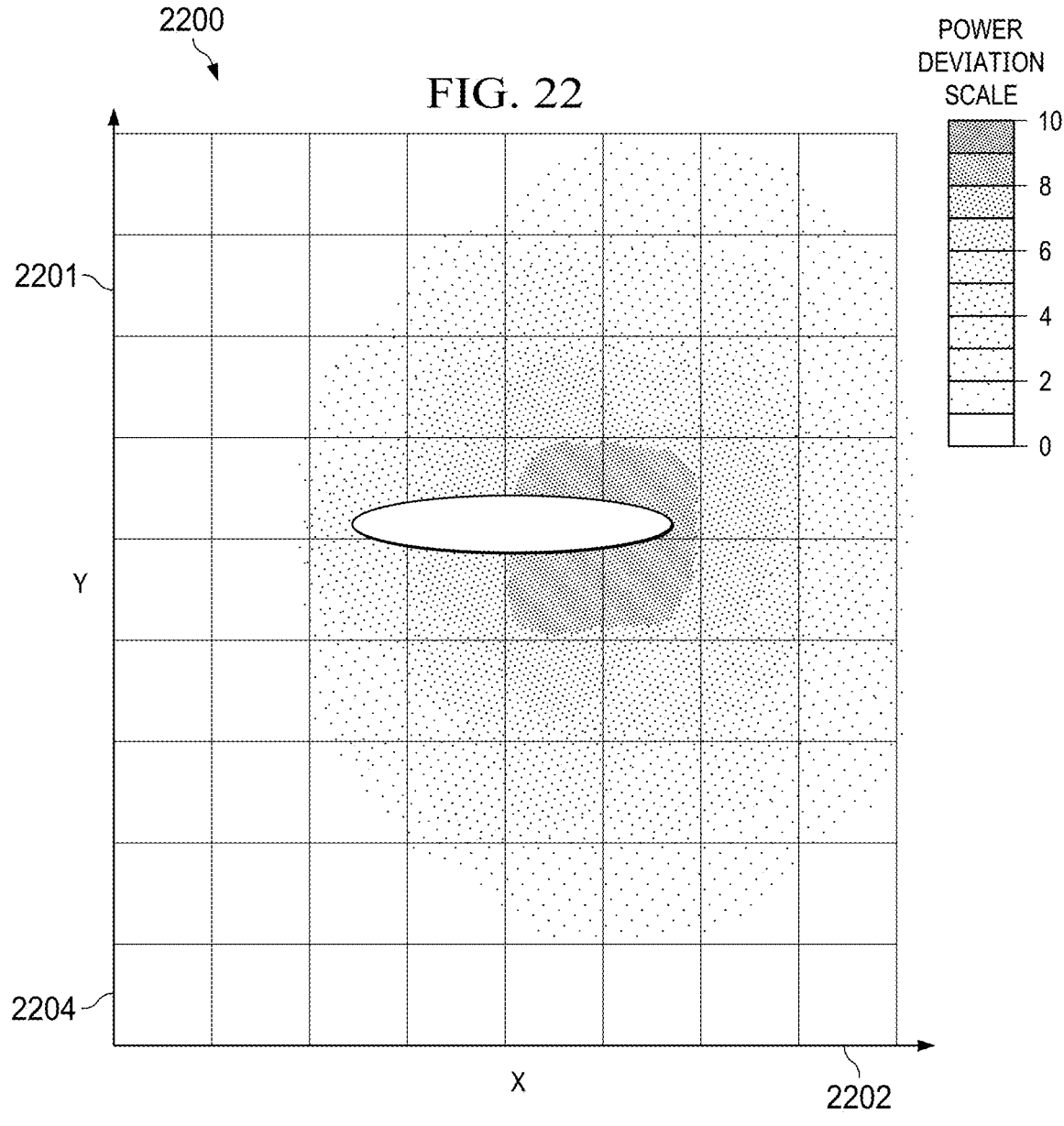
FIG. 22 is an illustration of air turbulence in different receiver locations in accordance with an illustrative embodiment.

Turning to FIG. 22, an illustration of air turbulence in different receiver locations is depicted in accordance with an illustrative embodiment. In this example, receiver locations 2200 in graph 2201 are shown. In this example, graph 2201 has x-axis 2202 and y-axis 2204. These locations correspond to xy coordinates for the different receiver locations for which power measurements have been made.

In this example, the power measurements have been translated into a scale from 0 to 10. As depicted, 0 represents no air turbulence and 10 represents the greatest amount of air turbulence. In this example, these values can correspond to pixels that are used to display air turbulence on a display system.

Figure 23:
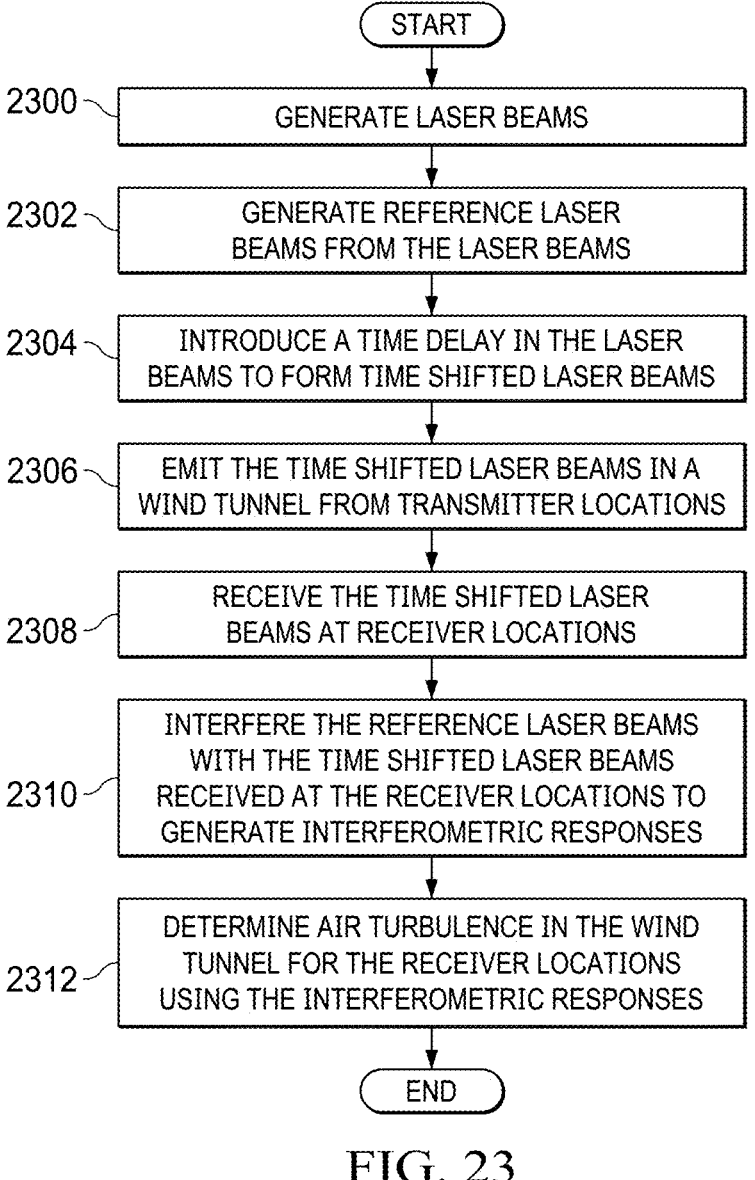
FIG. 23 is an illustration of a flowchart of a process for measuring turbulence in a wind tunnel in accordance with an illustrative embodiment.

Turning next to FIG. 23, an illustration of a flowchart of a process for measuring turbulence in a wind tunnel is depicted in accordance with an illustrative embodiment. The process in FIG. 7 can be implemented in hardware, software, or both. When implemented in software, the process can take the form of program instructions that are run by one or more processor units located in one or more hardware devices in one or more computer systems. For example, the process can be implemented in controller 1714 in computer system 1712 in FIG. 17.

The process begins by generating laser beams (operation 2300). The process generates reference laser beams from the laser beams (operation 2302). The process introduces a time delay in the laser beams to form time shifted laser beams (operation 2304).

The process emits the time shifted laser beams in a wind tunnel from transmitter locations (operation 2306). The process receives the time shifted laser beams at receiver locations (operation 2308). These receiver locations can also be referred to as measurement locations.

The process interferes the reference laser beams with the time shifted laser beams received at the receiver locations to generate interferometric responses (operation 2310). The process determines air turbulence in the wind tunnel for the receiver locations using the interferometric responses (operation 2312). The process terminates thereafter.

Turning now to FIG. 24, an illustration of a flowchart of a process for changing a time delay is depicted in accordance with an illustrative embodiment. The process in this figure is an example of operation 2304 in FIG. 23.

The process changes the time delay by at least one of physically changing the optical path length of the optical fiber, applying a stress to the optical fiber, changing a temperature of the optical fiber, or applying a static field to the optical fiber (operation 2400). The process terminates thereafter. In this example, the time delay can be selected to cause the interferometric responses to be most sensitive to changes in phase shifts of the shifted laser beams passing through the wind tunnel.

In FIG. 25, an illustration of a flowchart of a process for changing a time delay is depicted in accordance with an illustrative embodiment. The process in this figure is an example of operation 2304 in FIG. 23.

The process changes the time delay by moving a laser generating the laser beams forward or backward in a direction of laser beam emissions from the transmitter locations (operation 2500). The process terminates thereafter.

Figure 26:
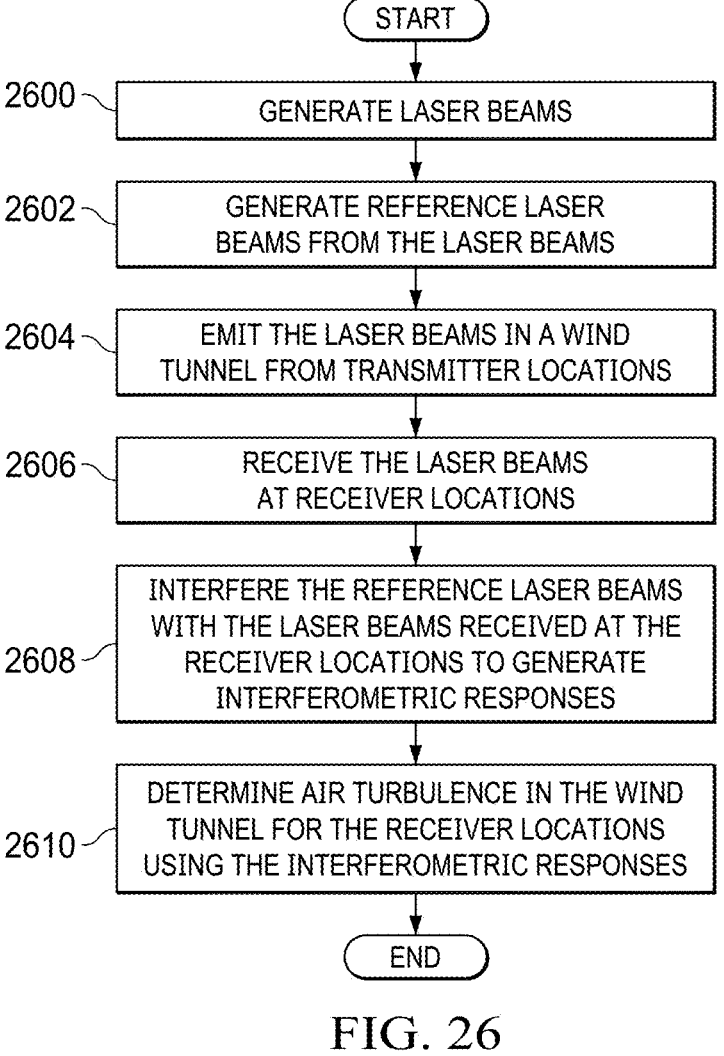
FIG. 26 is an illustration of a flowchart of a process for measuring turbulence in a wind tunnel in accordance with an illustrative embodiment.

Turning next to FIG. 26, an illustration of a flowchart of a process for measuring turbulence in a wind tunnel is depicted in accordance with an illustrative embodiment. The process in FIG. 26 can be implemented in hardware, software, or both. When implemented in software, the process can take the form of program instructions that are run by one or more processor units located in one or more hardware devices in one or more computer systems. For example, the process can be implemented in controller 1714 in computer system 1712 in FIG. 17. In this example, a time delay is not introduced into the laser beams before emitting the laser beams through the wind tunnel.

The process generates laser beams (operation 2600). The process generates reference laser beams from the laser beams (operation 2602).

The process emits the laser beams in a wind tunnel from transmitter locations (operation 2604). The process receives the laser beams at receiver locations (operation 2606). The process interferes the reference laser beams with the laser beams received at the receiver locations to generate interferometric responses (2608).

The process determines air turbulence in the wind tunnel for the receiver locations using the interferometric responses (operation 2610). The process terminates thereafter.

In one example, the object can be rotated about a number of axes in the wind tunnel to a new orientation using a mounting system in response to the laser sensor system emitting the time shifted laser beams from the transmitter locations to the receiver locations using the laser sensor system. In response to rotating the object, the time shifted laser beams are emitted from the transmitter locations to the receiver locations with the object in the new orientation.

The rotating the object and emitting the time shifted laser beams can be repeated for a number of new orientations of the object to create sets of laser beam detections. The interferometric responses can be determined for each of the number of new orientations using the sets of time shifted laser beam detections to form sets of interferometric responses. A three-dimensional model of air turbulence can be generated using the sets of interferometric responses.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

Figure 27:
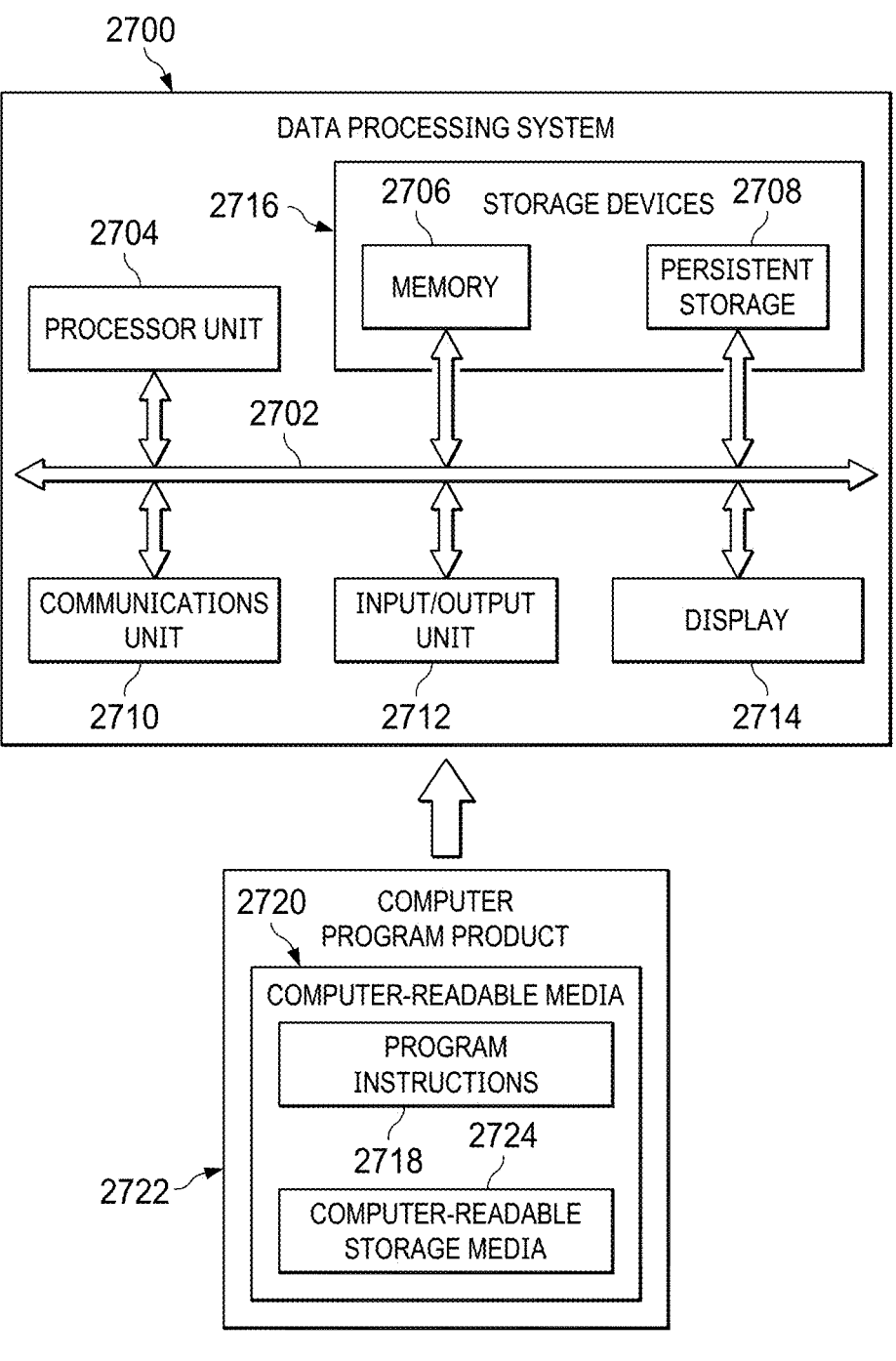
FIG. 27 is an illustration of a block diagram of a data processing system in accordance with an illustrative embodiment.

Turning now to FIG. 27, a block diagram of a data processing system is depicted in accordance with an illustrative embodiment. Data processing system 2700 can be used to implement computer system 212 in FIG. 2. In this illustrative example, data processing system 2700 includes communications framework 2702, which provides communications between processor unit 2704, memory 2706, persistent storage 2708, communications unit 2710, input/output (I/O) unit 2712, and display 2714. In this example, communications framework 2702 takes the form of a bus system.

Processor unit 2704 serves to execute instructions for software that can be loaded into memory 2706. Processor unit 2704 includes one or more processors. For example, processor unit 2704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2704 can be implemented using one or more heterogeneous processor systems in which a main processor is present with secondary processors on a single chip. As another illustrative example, processor unit 2704 can be a symmetric multi-processor system containing multiple processors of the same type on a single chip.

Memory 2706 and persistent storage 2708 are examples of storage devices 2716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2716 may also be referred to as computer-readable storage devices in these illustrative examples. Memory 2706, in these examples, can be, for example, a random-access memory or any other suitable volatile or non-volatile storage device. Persistent storage 2708 may take various forms, depending on the particular implementation.

For example, persistent storage 2708 may contain one or more components or devices. For example, persistent storage 2708 can be a hard drive, a solid-state drive (SSD), a flash memory, a rewritable optical disk, a rewritable magnetic tape, or some combination of the above. The media used by persistent storage 2708 also can be removable. For example, a removable hard drive can be used for persistent storage 2708.

Communications unit 2710, in these illustrative examples, provides for communications with other data processing systems or devices. In these illustrative examples, communications unit 2710 is a network interface card.

Input/output unit 2712 allows for input and output of data with other devices that can be connected to data processing system 2700. For example, input/output unit 2712 may provide a connection for user input through at least one of a keyboard, a mouse, or some other suitable input device. Further, input/output unit 2712 may send output to a printer. Display 2714 provides a mechanism to display information to a user.

Instructions for at least one of the operating systems, applications, or programs can be located in storage devices 2716, which are in communication with processor unit 2704 through communications framework 2702. The processes of the different embodiments can be performed by processor unit 2704 using computer-implemented instructions, which may be located in a memory, such as memory 2706.

These instructions are referred to as program instructions, computer usable program instructions, or computer-readable program instructions that can be read and executed by a processor in processor unit 2704. The program instructions in the different embodiments can be embodied on different physical or computer-readable storage media, such as memory 2706 or persistent storage 2708.

Program instructions 2718 are located in a functional form on computer-readable media 2720 that is selectively removable and can be loaded onto or transferred to data processing system 2700 for execution by processor unit 2704. Program instructions 2718 and computer-readable media 2720 form computer program product 2722 in these illustrative examples. In the illustrative example, computer-readable media 2720 is computer-readable storage media 2724.

Computer-readable storage media 2724 is a physical or tangible storage device used to store program instructions 2718 rather than a medium that propagates or transmits program instructions 2718. Computer-readable storage media 2724 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 2724, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 2718 can be transferred to data processing system 2700 using a computer-readable signal media. The computer-readable signal media are signals and can be, for example, a propagated data signal containing program instructions 2718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2720" can be singular or plural. For example, program instructions 2718 can be located in computer-readable media 2720 in the form of a single storage device or system. In another example, program instructions 2718 can be located in computer-readable media 2720 that is distributed in multiple data processing systems. In other words, some instructions in program instructions 2718 can be located in one data processing system while other instructions in program instructions 2718 can be located in one data processing system. For example, a portion of program instructions 2718 can be located in computer-readable media 2720 in a server computer while another portion of program instructions 2718 can be located in computer-readable media 2720 located in a set of client computers.

The different components illustrated for data processing system 2700 are not meant to provide architectural limitations to the manner in which different embodiments can be implemented. In some illustrative examples, one or more of the components may be incorporated in or otherwise form a portion of, another component. For example, memory 2706, or portions thereof, may be incorporated in processor unit 2704 in some illustrative examples. The different illustrative embodiments can be implemented in a data processing system including components in addition to or in place of those illustrated for data processing system 2700. Other components shown in FIG. 27 can be varied from the illustrative examples shown. The different embodiments can be implemented using any hardware device or system capable of running program instructions 2718.

Figure 28:
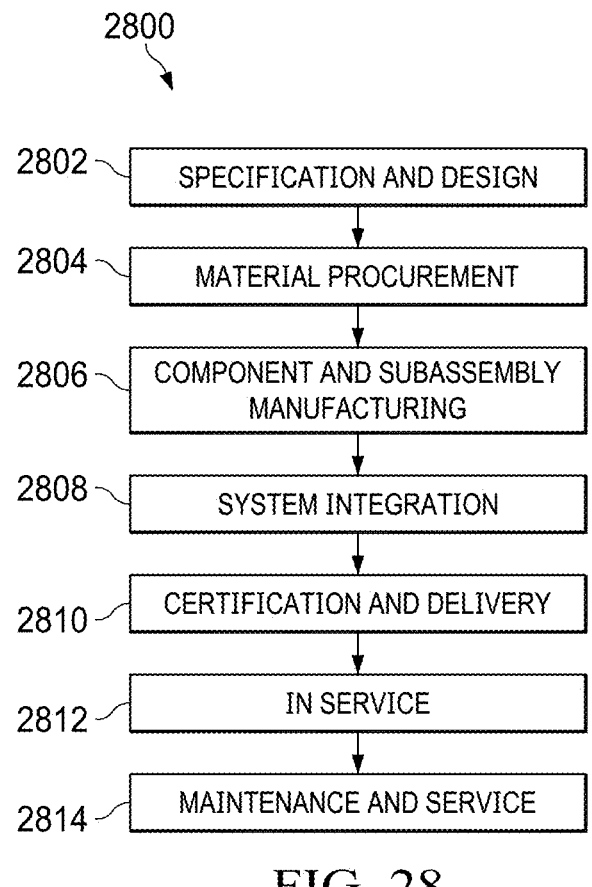
FIG. 28 is an illustration of an aircraft manufacturing and service method in accordance with an illustrative embodiment.
Figure 29:
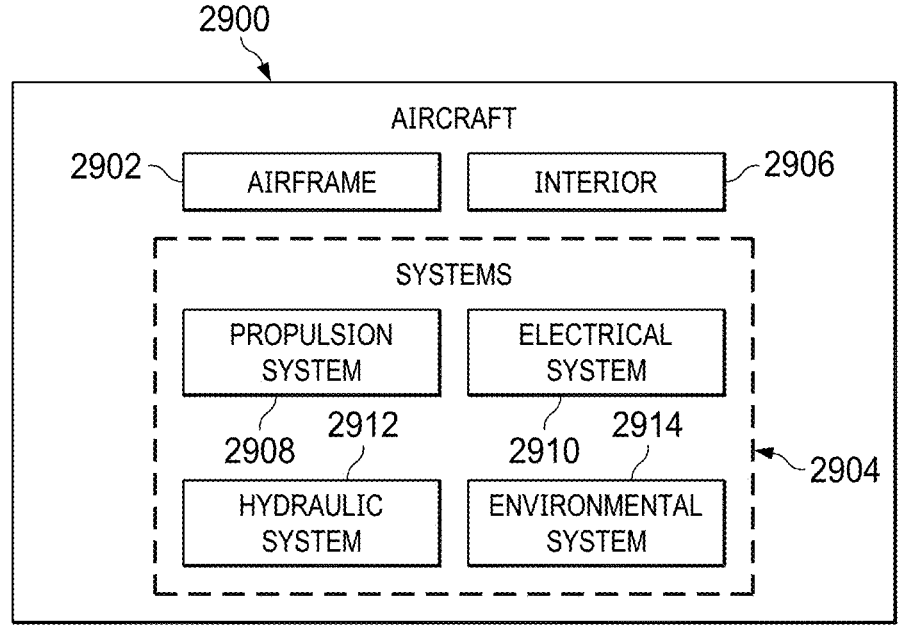
FIG. 29 is an illustration of a block diagram of an aircraft in which an illustrative embodiment may be implemented.

Illustrative embodiments of the disclosure may be described in the context of aircraft manufacturing and service method 2800 as shown in FIG. 28 and aircraft 2900 as shown in FIG. 29. Turning first to FIG. 28, an illustration of an aircraft manufacturing and service method is depicted in accordance with an illustrative embodiment. During pre-production, aircraft manufacturing and service method 2800 may include specification and design 2802 of aircraft 2900 in FIG. 29 and material procurement 2804.

During production, component and subassembly manufacturing 2806 and system integration 2808 of aircraft 2900 in FIG. 29 takes place. Thereafter, aircraft 2900 in FIG. 29 can go through certification and delivery 2810 in order to be placed in service 2812. While in service 2812 by a customer, aircraft 2900 in FIG. 29 is scheduled for routine maintenance and service 2814, which may include modification, reconfiguration, refurbishment, and other maintenance or service.

Each of the processes of aircraft manufacturing and service method 2800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 29, an illustration of an aircraft is depicted in which an illustrative embodiment may be implemented. In this example, aircraft 2900 is produced by aircraft manufacturing and service method 2800 in FIG. 28 and may include airframe 2902 with plurality of systems 2904 and interior 2906. Examples of systems 2904 include one or more of propulsion system 2908, electrical system 2910, hydraulic system 2912, and environmental system 2914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2800 in FIG. 28.

In one illustrative example, components or subassemblies produced in component and subassembly manufacturing 2806 in FIG. 28 can be fabricated or manufactured in a manner similar to components or subassemblies produced while aircraft 2900 is in service 2812 in FIG. 28. As yet another example, one or more apparatus embodiments, method embodiments, or a combination thereof can be utilized during production stages, such as component and subassembly manufacturing 2806 and system integration 2808 in FIG. 28. One or more apparatus embodiments, method embodiments, or a combination thereof may be utilized while aircraft 2900 is in service 2812, during maintenance and service 2814 in FIG. 28, or both. The use of a number of the different illustrative embodiments may substantially expedite the assembly of aircraft 2900, reduce the cost of aircraft 2900, or both expedite the assembly of aircraft 2900 and reduce the cost of aircraft 2900.

For example, laser wind tunnel turbulent airflow detection system 202 can be used during specification and design 2802 to develop aircraft 2900 having improved aerodynamics by generating designs in which reduce air turbulence can be identified during testing in wind tunnels. As another example, improved parts image generated during at least one of specification and design 2802 or maintenance and service 2814. For example, improved fairing can be developed to replace an existing fairing during modification, reconfiguration, refurbishment, and other maintenance or service that occurs in maintenance and service 2814.

Thus, illustrative examples provide a method, apparatus, system, and computer program product for measuring air turbulence in a wind tunnel. In one illustrative example, a laser wind tunnel turbulent airflow detection system comprises a laser sensor system and a controller. The laser sensor system is configured to emit laser beams in a wind tunnel from transmitter locations. The laser sensor system is configured to detect the laser beams at receiver locations. The controller is configured to emit the laser beams from the transmitter locations to the receiver locations using the laser sensor system. The controller is configured to determine beat frequencies of the laser beams detected by the laser sensor system at the receiver locations. The controller is configured to determine air turbulence in the wind tunnel for the receiver locations using the beat frequencies.

One or more illustrative examples provide an ability to at least one of air turbulence or visualize air turbulence, designs for air vehicles can be generated and improved upon. With the determination of air turbulence, visualization of air turbulence, or both, design changes can be made to air vehicles in a manner that increases fuel efficiency of those air vehicles.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes," "including," "has," "contains," and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A laser wind tunnel turbulent airflow detection system comprising:
   a laser sensor system configured to:
      emit laser beams in a wind tunnel from transmitter locations; and
      detect the laser beams at receiver locations; and
   a controller configured to:
      control emissions of the laser beams from the transmitter locations to the receiver locations using the laser sensor system;
      determine beat frequencies of the laser beams detected by the laser sensor system at the receiver locations; and
      determine air turbulence in the wind tunnel for the receiver locations using the beat frequencies.

2. The laser wind tunnel turbulent airflow detection system of claim 1, wherein the receiver locations are mapped to pixels, and wherein the controller is further configured to:
   map the air turbulence at the receiver locations to pixels;
   determine pixel properties using the air turbulence; and
   display the pixels with the pixel properties on a display system to form a display of the air turbulence.

3. The laser wind tunnel turbulent airflow detection system of claim 1, wherein the laser beams are coherent laser beams.

4. The laser wind tunnel turbulent airflow detection system of claim 1, wherein:

the laser sensor system is further configured to interfere a portion of the laser beams emitted with the laser beams received at the receiver locations to generate the beat frequencies.

5. The laser wind tunnel turbulent airflow detection system of claim 1, further comprising:
   a mounting system configured to hold an object in the wind tunnel;
   wherein the controller is further configured to:
      rotate the object about a number of axes in the wind tunnel to a new orientation using the mounting system in response to the laser sensor system emitting the laser beams from the transmitter locations to the receiver locations using the laser sensor system; and
      emit the laser beams from the transmitter locations to the receiver locations with the object in the new orientation.

6. The laser wind tunnel turbulent airflow detection system of claim 5, wherein the controller is further configured to:
   repeat rotating the object and emitting the laser beams for a number of new orientations of the object to create sets of laser beam detections;
   determine the beat frequencies for each of the number of new orientations using the sets of laser beam detections to form sets of beat frequencies; and
   generate a three-dimensional model of air turbulence using the sets of beat frequencies.

7. The laser wind tunnel turbulent airflow detection system of claim 6, wherein the controller is further configured to:
   display the three-dimensional model of the air turbulence on a display system.

8. The laser wind tunnel turbulent airflow detection system of claim 1, wherein the laser sensor system comprises:
   a laser transmitter system configured to emit the laser beams from the transmitter locations in the wind tunnel to the receiver locations;
   an optical receiver system configured to detect the laser beams at the receiver locations; and
   a positioning system configured to:
      position the laser transmitter system at the transmitter locations to emit the laser beams at the receiver locations; and
      position the optical receiver system at the receiver locations corresponding to the transmitter locations to receive the laser beams emitted from the transmitter locations.

9. The laser wind tunnel turbulent airflow detection system of claim 8, wherein the transmitter locations and the receiver locations are defined using a Cartesian coordinate system, and wherein a transmitter location and a receiver location corresponding to the transmitter location has a same xy coordinate.

10. The laser wind tunnel turbulent airflow detection system of claim 8, wherein:
   the laser transmitter system comprises laser transmitters at the transmitter locations;
   the optical receiver system comprises optical receivers at the receiver locations; and
   the positioning system comprises a frame system that holds the laser transmitters at the transmitter locations and holds the optical receivers at the receiver locations.

11. The laser wind tunnel turbulent airflow detection system of claim 8, wherein spacing between locations in the transmitter locations and the receiver locations corresponding to the transmitter locations is selected based on an amount of the air turbulence detected.

12. The laser wind tunnel turbulent airflow detection system of claim 11, wherein:

the air turbulence is represented by beat frequency amplitudes determined for the receiver locations;

a spacing between the receiver locations increases as the beat frequency amplitudes increase; and the spacing between the receiver locations decreases as the beat frequency amplitudes decrease.

13. The laser wind tunnel turbulent airflow detection system of claim 2, wherein:

the laser transmitter system comprises a laser transmitter;

the optical receiver system comprises an optical receiver; and the positioning system is configured to:

move the laser transmitter and the optical receiver to corresponding transmitter and receiver locations in the transmitter locations and the receiver locations.

14. The laser wind tunnel turbulent airflow detection system of claim 13, wherein:

in moving the laser transmitter and the optical receiver, the positioning system is configured to:

move the laser transmitter to scan the transmitter locations to emit the laser beams to the receiver locations; and move the optical receiver to the receiver locations corresponding to the transmitter locations to receive the laser beams emitted from the transmitter locations.

15. The laser wind tunnel turbulent airflow detection system of claim 13, wherein the controller is further configured to:

calibrate the laser transmitter with the optical receiver at each of the transmitter locations and the receiver locations.

16. A method for measuring turbulence in a wind tunnel, the method comprising:

emitting laser beams by a laser sensor system from transmitter locations in the wind tunnel to receiver locations;

detecting the laser beams by the laser sensor system at the receiver locations;

determining beat frequencies of the laser beams detected at the receiver locations; and determining air turbulence in the wind tunnel for the receiver locations using the beat frequencies.

17. The method of claim 16, wherein a spacing between locations in the transmitter locations and the receiver locations corresponding the transmitter locations is selected based on an amount of air turbulence detected, and wherein the air turbulence is represented by beat frequency amplitudes determined for the receiver locations; and further comprising:

increasing the spacing between the locations as the beat frequency amplitudes increase; and decreasing the spacing between the locations as the beat frequency amplitudes decrease.

18. The method of claim 16, wherein the receiver locations are mapped to pixels and further comprising:

mapping the air turbulence at the receiver locations to pixels;

determining pixel properties using the air turbulence; and displaying the pixels with the pixel properties on a display system to form a display of the air turbulence.

19. The method of claim 16, further comprising:

interfering a portion of the laser beams emitted with the laser beams received at the receiver locations to generate the beat frequencies for the receiver locations.

20. The method of claim 16, further comprising:

rotating an object about a number of axes in the wind tunnel to a new orientation in response to the laser sensor system emitting the laser beams from the transmitter locations to the receiver locations; and emitting the laser beams from the transmitter locations to the receiver locations with the object in the new orientation.

21. The method of claim 20, further comprising:

repeating rotating the object and emitting the laser beams for a number of new orientations of the object to create sets of laser beam detections;

determining the beat frequencies for each of the number of new orientations using the sets of laser beam detections to form sets of beat frequencies; and generating a three-dimensional model of air turbulence using the sets of beat frequencies.

22. The method of claim 21, further comprising:

displaying the three-dimensional model of the air turbulence on a display system.

23. The method of claim 16, wherein the laser sensor system comprises:

a laser transmitter system configured to emit the laser beams from the transmitter locations in the wind tunnel to the receiver locations;

an optical receiver system configured to detect the laser beams at the receiver locations; and further comprising:

positioning the laser transmitter system at the transmitter locations to emit the laser beams to the receiver locations; and positioning the optical receiver system at the receiver locations corresponding to the transmitter locations to receive the laser beams emitted from the transmitter locations.

24. The method of claim 23, wherein the laser transmitter system comprises a laser transmitter and the optical receiver system comprises an optical receiver; and further comprising:

moving the laser transmitter to scan the transmitter locations to emit the laser beams to the receiver locations; and moving the optical receiver to the receiver locations corresponding to the transmitter locations to receive the laser beams emitted from the transmitter locations.

25. The method of claim 23, wherein the laser transmitter system comprises a laser transmitter and the optical receiver system comprises an optical receiver; and further comprising:

moving the laser transmitter and the optical receiver to corresponding transmitter and receiver locations in the transmitter locations and the receiver locations.

26. The method of claim 25, further comprising:

calibrating the laser transmitter with the optical receiver at each of the transmitter locations and the receiver locations.

27. A laser wind tunnel turbulent airflow detection system comprising:
    a laser sensor system configured to:
        generate laser beams;
        generate reference laser beams from the laser beams;
        emit the laser beams in a wind tunnel from transmitter locations;
        receive the laser beams at receiver locations; and
        interfere the reference laser beams with the laser beams received at the receiver locations to generate interferometric responses; and
    a controller configured to:
        control emissions of the laser beams in the wind tunnel from the transmitter locations to the receiver locations using the laser sensor system; and
        determine air turbulence in the wind tunnel for the receiver locations using the interferometric responses.

28. A laser wind tunnel turbulent airflow detection system comprising:
    a laser sensor system configured to:
        generate laser beams;
        generate reference laser beams from the laser beams;
        introduce a time delay in the laser beams to form time shifted laser beams;
        emit the time shifted laser beams in a wind tunnel from transmitter locations;
        receive the time shifted laser beams at receiver locations; and
        interfere the reference laser beams with the time shifted laser beams received at the receiver locations to generate interferometric responses; and
    a controller configured to:
        control emissions of the time shifted laser beams in the wind tunnel from the transmitter locations to the receiver locations using the laser sensor system; and
        determine air turbulence in the wind tunnel for the receiver locations using the interferometric responses.

29. The laser wind tunnel turbulent airflow detection system of claim 28, wherein the laser sensor system comprises:
    a laser interferometry system configured to determine interferometric responses using the reference laser beams and the time shifted laser beams received at the receiver locations.

30. The laser wind tunnel turbulent airflow detection system of claim 28, wherein the time delay is selected to cause the interferometric responses to be most sensitive to changes in phase shifts of the time shifted laser beams passing through the wind tunnel.

31. The laser wind tunnel turbulent airflow detection system of claim 28, wherein the time delay is selected to shift a phase of the time shifted laser beams passing through the wind tunnel by $\pi/2$ radians.

32. The laser wind tunnel turbulent airflow detection system of claim 28, wherein the interferometric responses correlate with air turbulence that the time shifted laser beams pass through in the wind tunnel.

33. The laser wind tunnel turbulent airflow detection system of claim 28, wherein the laser sensor system is a homodyne laser sensor system.

34. The laser wind tunnel turbulent airflow detection system of claim 28, further comprising:

a mounting system configured to hold an object in the wind tunnel;
    wherein the controller is further configured to:
        rotate the object about a number of axes in the wind tunnel to a new orientation using the mounting system in response to the laser sensor system emitting the time shifted laser beams from the transmitter locations to the receiver locations using the laser sensor system; and
        emit the time shifted laser beams from the transmitter locations to the receiver locations with the object in the new orientation.

35. The laser wind tunnel turbulent airflow detection system of claim 34, wherein the controller is further configured to:
    repeat rotating the object and emitting the time shifted laser beams for a number of new orientations of the object to create sets of laser beam detections;
    determine the interferometric responses for each of the number of new orientations using the sets of time shifted laser beam detections to form sets of interferometric responses; and
    generate a three-dimensional model of air turbulence using the sets of interferometric responses.

36. The laser wind tunnel turbulent airflow detection system of claim 28, wherein:
    the laser sensor system comprises a time delay generator configured to introduce the time delay in laser beams to form the time shifted laser beams; and
    the controller is configured to control the time delay using the time delay generator.

37. The laser wind tunnel turbulent airflow detection system of claim 36, wherein the time delay generator comprises:
    a movement mechanism configured to move a laser generating the laser beams forward or backward in a direction of laser beam emissions.

38. The laser wind tunnel turbulent airflow detection system of claim 36, wherein the time delay generator comprises:
    an optical fiber; and
    a state changer configured to change the time delay by at least one of physically changing an optical path length of the optical fiber, applying a stress to the optical fiber, changing a temperature of the optical fiber, or applying a static field to the optical fiber.

39. The laser wind tunnel turbulent airflow detection system of claim 38, wherein the optical fiber in the state changer is configured to change the optical path length of the optical fiber using at least one of heat or pressure.

40. The laser wind tunnel turbulent airflow detection system of claim 28, wherein the laser sensor system comprises:
    a laser transmitter system configured to emit the time shifted laser beams from the transmitter locations in the wind tunnel to the receiver locations; and
    an optical receiver system configured to detect the time shifted laser beams at the receiver locations; and
    a positioning system configured to:
        position the laser transmitter system at the transmitter locations to emit the time shifted laser beams to the receiver locations; and
        position the optical receiver system at the receiver locations corresponding to the transmitter locations to receive the time shifted laser beams emitted from the transmitter locations.

41. The laser wind tunnel turbulent airflow detection system of claim 40, wherein the transmitter locations and the receiver locations are defined using a Cartesian coordinate system, and wherein a transmitter location and a receiver location corresponding to the transmitter location has a same xy coordinate.

42. The laser wind tunnel turbulent airflow detection system of claim 40, wherein:

the laser transmitter system comprises a laser transmitter;

the optical receiver system comprises an optical receiver; and the positioning system is configured to move;

the laser transmitter to the transmitter locations; and the optical receiver to the receiver locations.

43. The laser wind tunnel turbulent airflow detection system of claim 42, wherein in moving the laser transmitter and the optical receiver, the positioning system is configured to:

move the laser transmitter to scan the transmitter locations to emit the time shifted laser beams to the receiver locations; and move the optical receiver to the receiver locations corresponding to the transmitter locations to receive the time shifted laser beams emitted from the transmitter locations.

44. A method for measuring air turbulence in a wind tunnel, the method comprising:

generating laser beams;

generating reference laser beams from the laser beams;

emitting the laser beams in the wind tunnel from transmitter locations;

receiving the laser beams at receiver locations;

interfering the reference laser beams with the laser beams received at the receiver locations to generate interferometric responses; and determining air turbulence in the wind tunnel for the receiver locations using the interferometric responses.

45. A method for measuring air turbulence in a wind tunnel, the method comprising:

generating laser beams;

generating reference laser beams from the laser beams;

introducing a time delay in the laser beams to form time shifted laser beams;

emitting the time shifted laser beams in the wind tunnel from transmitter locations;

receiving the time shifted laser beams at receiver locations;

interfering the reference laser beams with the time shifted laser beams received at the receiver locations to generate interferometric responses; and determining air turbulence in the wind tunnel for the receiver locations using the interferometric responses.

46. The method of claim 45, wherein said introducing the time delay comprises:

changing the time delay by at least one of physically changing a length of an optical fiber, applying a stress to the optical fiber, changing a temperature of the optical fiber, or applying a static field to the optical fiber.

47. The method of claim 45, wherein said introducing the time delay comprises:

changing the time delay by moving a laser generating the laser beams forward or backward in a direction of laser beam emissions from the transmitter locations.

* * * * *